United States Patent [19]
Nagel et al.
[11] E Patent Number: Re. 32,326
[45] Reissued Date of Patent: Jan. 6, 1987

[54] ROW GRABBING SYSTEM

[75] Inventors: Robert H. Nagel, New York; Richard Saylor, Monsey, both of N.Y.

[73] Assignee: IRD, Inc., Farmingdale, N.Y.

[21] Appl. No.: 496,273

[22] Filed: May 19, 1983

Related U.S. Patent Documents

Reissue of:
[64] Patent No.: 3,889,054
Issued: Jun. 10, 1975
Appl. No.: 434,226
Filed: Jan. 17, 1974

[51] Int. Cl.[4] ..... H04N 5/00
[52] U.S. Cl. ..... 358/83; 358/141
[58] Field of Search ..... 358/83, 141, 203

[56] References Cited

U.S. PATENT DOCUMENTS

| | | | |
|---|---|---|---|
| 3,369,073 | 2/1968 | Scholz | 178/5.6 |
| 3,488,435 | 1/1970 | Eilenberger | 178/5.6 |
| 3,602,891 | 8/1971 | Clark | 340/172.5 |
| 3,609,227 | 9/1971 | Kuljian | 360/35 |
| 3,647,949 | 3/1972 | Closs | 178/5.6 |
| 3,649,749 | 3/1972 | Gibson | 178/5.6 |

FOREIGN PATENT DOCUMENTS 2058681 9/1973 Fed. Rep. of Germany .

*Primary Examiner*—Michael A. Masinick
*Attorney, Agent, or Firm*—Stiefel, Gross, Kurland & Pavane

[57] ABSTRACT

A real time frame grabbing system for substantially instantaneously providing a continuous video display or a selectable predetermined video frame of information on a video display means from continuously transmittable video information which is transmitted as a plurality of pseudo video scan lines wherein the selected frame being grabbed is updatable on a displayable row by displayable row basis. Each of the pseudo video scan lines has a television scan line format and comprises a complete self-contained packet of digital information sufficient to provide an entire displayable row of video data characters, the pseudo video scan line having an associated transmission time equivalent to that of a television video scan line. The packet of digital information comprises at least address information for a displayable row and data information for the displayable characters in the row. Each of these psuedo video scan lines further comprises a horizontal sync signal at the beginning thereof which provides a record separator between adjacent pseudo video scan lines and resets the input receiver logic for the transmitted pseudo video scan lines upon the detection of each horizontal sync signal to provide noise immunity enhancement. The pseudo video scan lines are transmitted and received through a conventional television distribution system. Each pseudo video scan line contains means for error checking the contents of the received pseudo video scan line for inhibiting display of the associated displayable row when the error check is not satisfied. Programmable means, such as a general purpose digital computer, is conventionally programmed to interleave the pseudo video scan line signal transmission to provide pseudo video scan line information corresponding to a common assigned row for a plurality of frames before providing such information corresponding to a subsequent different common assigned row for the plurality of frames.

26 Claims, 19 Drawing Figures

ROW GRABBING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to video communication systems in which individual frames may be grabbed for video display thereof.

2. Description of the Prior Art

Video communication systems in which individual frames may be grabbed for video display are well known, such as the system disclosed in U.S. Pat. No. 3,740,465, or a system employing the Hitachi frame grabbing disc. These prior art systems such as the one disclosed in U.S. Pat. No. 3,746,780 are normally two-way request response systems requiring the user to request information by the dialing of a specific digital code which is uniquely assigned to each frame. However, such systems normally grab a group of frames for storage and then subsequently select the individual frame for display out of the group of grabbed frames as opposed to instantaneously selecting a single frame in real time. Furthermore, such prior art systems do not provide for real time updating of the grabbed video frame. Furthermore, some such prior art frame grabbing systems, such as the type disclosed in U.S. Pat. No. 3,397,283 are normally capable of only grabbing the next immediate signal in response to the provision of a starter signal or, as disclosed in U.S. Pat. No. 3,051,777, utilize a counter for frame location which must be reset to the beginning of a tape for video tape supplied information in order to locate a selected frame to be grabbed. These systems are not applicable in a real time frame grabbing environment. Similarly, other typical prior art frame grabbing systems, such as disclosed in U.S. Pat. Nos. 3,695,565; 2,955,197; 3,509,274; 3,511,929 and 3,582,651 can not be utilized in a real time frame grabbing environment, such as one in which the video information associated with the grabbed frame is capable of being continuously updated. Accordingly, presently available prior art frame grabbing systems familiar to the Inventors are not capable of easily locating a frame to be grabbed in real time nor of being able to continuously update such a grabbed frame in real time.

Video communication systems in which the signal being transmitted is digitized are also well known. For example, U.S. Pat. No. 3,743,767 discloses a video communication system for the transmission of digital data over standard television channels wherein the digital data is transmitted in a conventional television scan line format through conventional television distribution equipment. However, such prior art communication system merely digitizes one television scan line at a time for distribution to a video display terminal on a bit-by-bit basis in a line, 84 bits of information being provided per television scan line. Furthermore, such a prior art system is not transmission selectable by every display terminal nor is the data for a displayable video row packed into a self-contained pseudo video scan line information packet. Thus, there is no significant increase in the data transmission rate resulting from such a prior art video communication system. Similarly, U.S. Pat. Nos. 3,061,672 and 3,569,617 are examples of other prior art video communication systems in which television signals are digitized without any significant resultant compression in data transmission time. Furthermore, these other prior art systems require special distribution circuitry. In addition, prior art video communication system in which a digital television signal is transmitted do not sufficiently isolate the individual rows comprising a frame so as to provide satisfactory noise immunity between these rows, noise immunity at best being provided between frames, nor is there satisfactory data compression in the transmission time of the video information in such prior art systems.

These disadvantages of the prior art are overcome by the present invention.

SUMMARY OF THE INVENTION

A real time frame grabbing system for substantially instantaneously providing a continuous video display of a selectable predetermined video frame of information on a video display means from continuously transmittable video information, wherein such information is transmitted as a plurality of pseudo video scan lines is provided. Each of the pseudo video scan lines has a television video scan line format and comprises a complete self-contained packet of digital information sufficient to provide an entire displayable row of video data characters, the pseudo video scan line having an associated transmission time equivalent to that of a television video scan line. The packet of digital information comprises at least address information, such as page, group, permission, user and direct address for a displayable row and data information for the displayable characters, such as 32 characters, in a displayable row. Each of the pseudo video scan lines further comprises a horizontal sync signal at the beginning thereof, each horizontal sync signal providing a record separator between adjacent pseudo video scan lines as well as providing noise immunity on a row by row basis for resetting all the input logic in the receiver which processes the transmitted signal every horizontal sync pulse. The transmitter for the pseudo video can line includes means for providing a vertical sync signal after a predetermined plurality of pseudo video scan lines have been transmitted, the pseudo video scan line being a composite video signal. These transmitted pseudo video scan line composite vieo signals are distributed through a conventional television distribution system, such as a cable distribution system, to various video display means for providing a continuous video display thereof. The receiver which is operatively connected between the distribution network and an associated video display means, processes the distributed composite pseudo video scan line signals and provides a displayable video row to the associated video display means from each of the pseudo video scan line signals pertaining to the frame selected in order to provide the continuous video display, a predetermined plurality of displayable video rows comprising a displayable video frame of information. The receiver also preferably includes means for updating the continuously video displayable selectable frame on a displayable video row-by-row basis dependent on the real time data information content of the received pseudo video scan line.

Each of the packets of digital information contained within the pseudo video scan line, also preferably includes an error check information content based upon at least the address and data information content of the associated pseudo video scan line, the receiver including error check means for obtaining an error check indication of the distributed associated pseudo video scan line and comparing the error check indication with the error check information content of the associated pseudo video scan line in accordance with a predetermined error check condition for providing a predetermined output condition when the error check condition is satisfied. The receiver also includes condition responsive means operatively connected to the error check means for preventing the provision of the displayable video row from the associated pseudo video scan line when the predetermined output condition is not met.

The system also preferably includes programmable means, such as a general purpose computer, for receiving the continuously transmittable video information, retrievably storing the information, reformatting it into a desired pseudo video scan line format and continuously providing this reformatted information to the transmitter on a word-by-word basis, a word comprising a pair of displayable characters. Furthermore, the programmable means preferably includes means for interleaving the reformatted pseudo video scan line information to provide pseudo video scan line information corresponding to a common assigned row for a plurality of frames to the transmitter before providing pseudo video scan line information corresponding to a subsequent different common assigned row for the plurality of frames to the transmitter. Thus, the provision of the pseudo video scan line enables the use of conventional television transmission techniques and equipment for transmission and reception as well as conventional television circuitry for processing the received and transmitted signals. Furthermore, by utilizing the horizontal sync as a record separator, one can insure that any loss of synchronization or noise pulse will not disrupt more information than one pseudo video scan line. In addition, significant data compression in transmission time is obtained by transmitting the pseudo video scan lines as opposed to conventional television scan lines, with each pseudo video scan line being a self contained packet of information sufficient for display of an entire displayable video row containing a plurality of conventional television scan lines, such as 13, as opposed to display of one television scan line.

In the present invention, frame grabbing is accomplished by preferably feeding the pseudo video scan line into a buffer storage for comparison with an information request from the [keyboarad] *keyboard* which, if matched, updates the appropriate memory for display or selection control so that updating is, in reality, accomplished on a row-by-row basis as opposed to a page or frame-by-frame basis as new information is provided in real time, the selected frame being automatically updated in real time as new information is provided for a given row of the displayed selected frame.

DETAILED DESCRIPTION OF THE PREFERRED EMBODIMENT

System General Description

Figure 18:
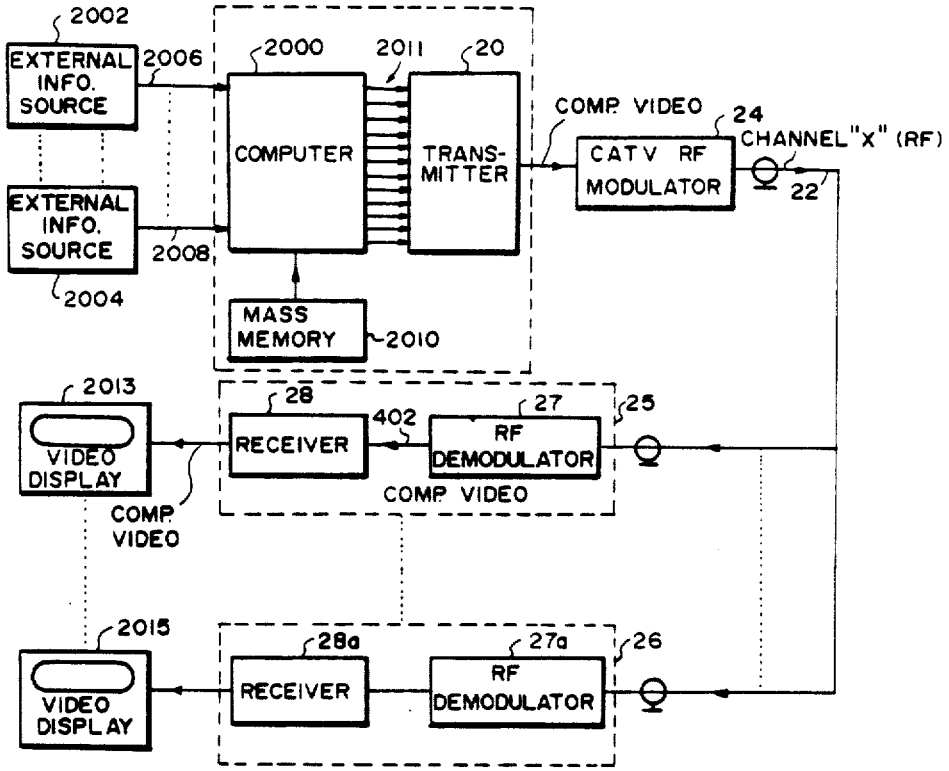
FIG. 18 is a functional block diagram of the preferred embodiment of the row grabbing system of the present invention.

Referring now to the drawings in detail and initially to FIG. 18 thereof, the preferred embodiment of the row grabbing system, generally referred to by the reference numeral 10, of the present invention is shown. As will be described in greater detail hereinafter, the row grabbing system 10 of the present invention is preferably a one-way frame grabbing system in which continuously transmitted information or messages are transmitted via pseudo video scan lines 12 (FIG. 1 and 2) on a row by row basis, with the pseudo video scan line 12 preferably being identical in format to a conventional video scan line, that is it is consistent with FCC and EIA standards for a video scan line signal format; however, this pseudo video scan line 12 actually contains a row of information, such as approximately between 11 and 13 actual television video scan lines of information, with the transmission time of the pseudo video scan line 12 preferably being equal to the transmission time of a conventional TV video scan line, which is approximately 63 microseconds. The various portions of the pseudo video scan line 12 will be described in greater detail hereinafter with reference to FIGS. 1 and 2. In the row grabbing system 10 of the present invention, the information is updated on a row by row basis by transmission of a pseudo video scan line containing new information so that the frame being grabbed will effectively have this row containing new information updated when this row of information is updated in memory. In the preferred system 10 of the present invention, continuously transmitted information or messages may be instantaneously "grabbed" in real time so as to repetitively provide a video display of a selected video frame of such information which may be updated on a row by row basis in real time.

Video information may be of any conventional type, such as news information, money rate information, stock market information, local advertising, television program listings, weather information, consumer information, etc., which is conventionally supplied from conventional external information sources for these types of information such as sources 2,002 and 2004 shown by way of example. These conventional external information sources 2,002 and 2,004 preferably conventionally supply this information in a digital format, such as from a ticker for news information or stock information, by way of example, through a conventional communication line 2,006 or 2,008 or a conventional local video terminal, preferably, to a conventional mini computer 2000, such as a model number PDP-8e manufactured by Digital Equipment Corp. Mini-computer 2000 preferably has an associated conventional mass memory 2010 for conventional storage of data. Computer 2000 stores this information in mass memory 2010, reformats it, such as by adding header information, and continuously provides this information as a 12 bit parallel output 2011 to a transmitter 20, to be described in greater detail hereinafter, which provides the pseudo video scan line 12 for transmission to the TV distribution network. It should be noted that at any time, the twelve bit parallel output of computer 2000 preferably represents two characters or one word. If desired, a 14 bit parallel bit output from the computer 2000 could be utilized to provide two seven bit characters. Computer 2000 shall be described in greater detail hereinafter with reference to FIG. 14. The mass memory 2010 is preferably updated by the computer 2000 in conventional fashion at the optimum transfer time for data which is, conventionally, not necessarily in the order of reception of the external information from sources 2002 and 2004, this data being preferably continuously suppliable in real time to the computer 2000. In conventional fashion, the information in computer 2000 is supplied to transmitter 20 which, in turn, supplies this information to a CATV cable system 22 through a conventional RF modulator 24, composite video being supplied to modulator 24 from transmitter 20. One such modulator 24 is preferably provided for each television channel on which information is to be transmitted, only one such channel being illustrated in FIG. 18 by way of example. Preferably, the mass memory 2010 which is read in conventional fashion by computer 2000 to provide the requisite information via transmitter 20 to the CATV cable system 22, has sufficient storage capacity to store the entire page capacity of the system.

As used hereinafter throughout the specification and claims the term page means one video frame of information, the term group means a predetermined number of pages, the term row is a displayable video row and means a portion of a page containing a plurality of conventional television video scan lines, and the term pseudo video scan line means a signal which is identical in form to that of a conventional video scan line but which actually contains a row of information, such as approximately between 11 and 13 actual television video scan lines of information with the transmission time of the pseudo video scan line being equal to the transmission time of a conventional TV video scan line and with the pseudo video scan line being an entire packet of information necessary for video display of that row. The term conventional or television video scan line is used in its conventional manner.

The mass memory 2010 may be any conventional mass memory storage device sufficient to store the requisite page capacity of the system, such as an RK-08 memory device manufactured by Digital Equipment Corp. The output of the computer 2,000 is preferably conventionally transmitted from computer 2,000 to the transmitter 20 via a conventional data break of the computer 2,000. All pages of information are preferably continuously being transmitted from the computer 2000 through transmitter 20 on a pseudo video scan line by pseudo video scan line basis, that is respectively on a row by row basis, through the appropriate RF Modulator 24 for the video channel being utilized and, therefrom, through the CATV cable system 22 to conventional video display terminals or devices 2013 and 2015, such as commercially available video monitors, two such devices being shown by way of example. It should be noted that the number of video display devices 2013 and 2015 preferably has no requisite correlation with the number of [eternal] *external* information sources 2002 and 2004 and more sources 2002 and 2004 could be utilized than video display devices 2013 and 2015 or vice versa, if desired. In normal contemplated use, the number of video display devices 2013 and 2015 will normally exceed the number of external information sources 2002 and 2004, however, this need not be the case. The computer 2000 conventionally recirculates the data provided thereto in continuous fashion and, as previously mentioned, eventually updates the mass memory 2010 at the optimum transfer time for the data, which time is not necessarily in the order of reception of the external information from sources 2002 and 2004. The information from external sources 2002 and 2004, which is preferably being provided substantially continuously to the computer 2000 (as long as it is being generated from the external sources 2002 and 2004) is provided to the mass memory 2010 and instantaneously to the transmitter 20 which operates in a manner to be described in greater detail hereinafter to provide the pseudo video scan line 12 transmission of the information. As will also be described in greater detail hereinafter, each video display device 2013 and 2015 preferably has an associated display control unit 25 and 26, respectively, which, as will be described in greater detail hereinafter, preferably functions to enable the real time frame grabbing or selection of a single page of continuously transmitted information for the instantaneous repetitive continuous video display, or frame grabbing, thereof, this information being updatable on a row by row basis in real time. Preferably, each of the display control units 25 and 26 by way of example, one such display control unit preferably being associated with each video display terminal or device, are identical in structure and operation. If desired, however, any display control unit 25–26 may be modified in a manner to be described in greater detail hereinafter so as to prevent the reception of certain categories of information while enabling the reception of other categories of information. For purposes of clarity, only one such typical display control unit 25 will be described by way of example, the structure and operation, as previously mentioned, being identical with that of display control unit 26. Identical reference numerals, followed by the letter a will be utilized in FIG. 18 for elements of display control unit 26 which are identical in structure and operation with those of display control unit 25. In the overall system block diagram of FIG. 18, the display control unit 25 only preferably contains a conventional RF demodulator 27, one such demodulator 27 being provided for each channel and a receiver 28, to be described in greater detail hereinafter, which receiver receives the composite video demodulated by demodulator 27 and determines whether the user is correct, the user has permission to receive the pseudo video scan line of information being transmitted at that time, whether the signal is error free, whether the page address of the pseudo video scan line is correct, and whether a direct address condition, to be described in greater detail hereinafter, exists, and, preferably assuming the pseudo video scan line signal passes all these tests, then the receiver processes this signal and provides a video signal corresponding to a displayable row of information on the video display device 2013. The keyboard which accomplishes the selection of the desired page or video frame of information and the appropriate group thereof to be grabbed or repetitively displayed on the video display terminal 2013 is included as part of the receiver portion 28 and will be described in greater detail hereinafter as part of the receiver portion 28 of the system 10.

TRANSMITTER

General Description

Figure 14:
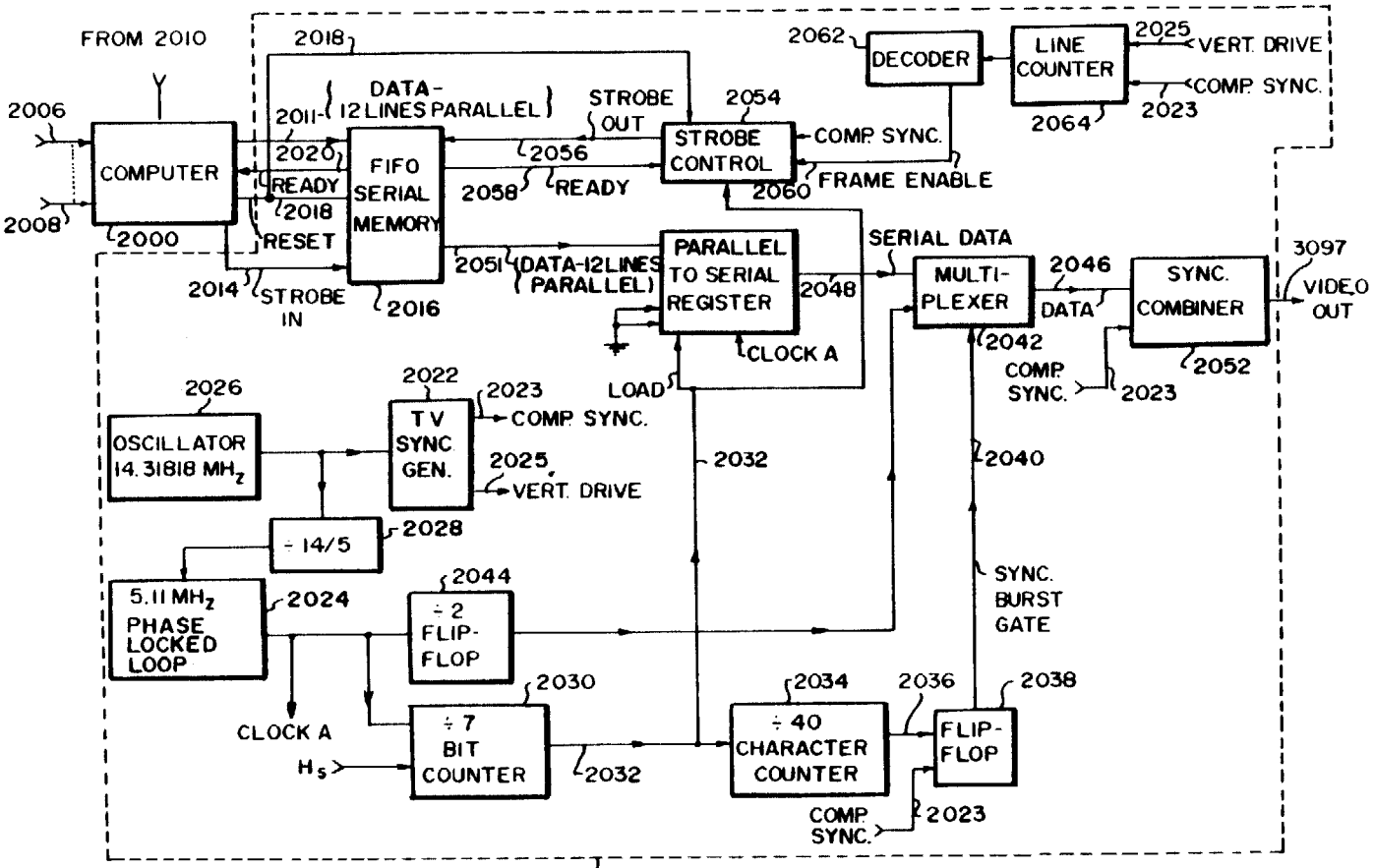
FIG. 14 is a block diagram of the preferred transmitter portion of the present invention.

Referring now to FIG. 14, initially, the transmitter portion 20 of the row grabbing system 10 of the present invention shall generally be described in greater detail. Thereafter, with reference to FIGS. 15, 16 and 17, the preferred transmitter portion 20 of the present invention shall be described in greater detail.

Computer 2000 which provides the 12 bit parallel output 2011 of data also provides a strobe command, as will be described in greater detail hereinafter, via path 2014, the strobe command on path 2014 and the 12 parallel lines of data 2011 being preferably loaded into a conventional FIFO word series memory, shown in greater detail in FIG. 15, which acts like a parallel shift register. FIFO memory 2016 preferably accepts information under command of the strobe line 2014 from computer 2000 and can preferably store up to 64 words which is 128 characters of information, two characters of information comprising one word. Computer 2000 can [slo] *also* preferably completely erase FIFO memory 2016 by the provision of a reset command via path 2018, as will be described in greater detail hereinafter. FIFO memory 2016 supplies a ready signal to computer 2000 via path 2020 which denotes that the input location of memory 2016 is empty. Computer 2000 only preferably strobes data into FIFO memory 2016 if the ready line 2020 is asserted. It should be noted that preferably the inputting and outputting of memory 2016 are completely independent of each other.

The transmitter 20 preferably includes a conventional television sync generator 2022 which provides composite sync via path 2023 in accordance with EIA standards as well as vertical drive via path 2025. The timing of sync generator 2022 is preferably controlled by conventional crystal controlled oscillator 2026, such as a 14.31818 megahertz crystal controlled oscillator, in conventional fashion. The transmitter 20 preferably requires a master clock to control the bit rate of transmission. This bit rate, which is preferably selected at 5.113657 megahertz, must preferably be synchronized with the composite sync. The data bit rate selected must be consistent with the broadcast television channel [band width] *bandwidth* and must be an integral multiple of the horizontal frequency, which is necessary to keep the data bits phase locked with the horizontal sync signal. The 5.113657 megahertz clock, which shall be referred to as clock A, is preferably obtained by a conventional crystal controlled phase locked loop 2024 which is locked at 5/14 of the 14.31818 megahertz oscillator 2026 frequency through a divide-by-14/5 frequency divider 2028. The clock A output of phase locked loop 2024 is preferably divided by a conventional divide-by-seven bit counter 2030 in order to generate a pulse on line 2032 which represents the start of each character. This pulse is provided in parallel to a character counter 2034 which uses this signal as a clock input and preferably counts up to 40, counter 2034 being a divide-by-40 counter, to establish the period corresponding to the 40 characters preferably contained within a single pseudo video scan line 12. The output of character counter 2034 is preferably a pulse on line or path 2036 which occurs during the period of the 40th character. The trailing edge of the pulse present on path 2036 preferably sets a flip-flop 2038 which is reset by the composite sync provided via path 2023 from sync generator 2022. Thus, the output of flip-flop 2038 is a gate which starts at the end of the 40th character and ends at the beginning of the horizontal sync pulse. During this gating time, it is preferably desired to transmit a burst of sync pulses which are identical to a stream of alternate "0" and "1" data bits, this burst of sync pulses being located in region F (FIG. 1) of the pseudo video scan line 12, as will be described in greater detail hereinafter. This signal which is provided on line 2040 is termed the sync burst gate and is provided to a multiplexer 2042 as one input thereto, this input being the control or select input for multiplexer 2042.

One selectable input to multiplexer 2042 is provided from the output of a divide-by-2 flip-flop 2044 whose input is the clock A output of phase locked loop 2024. When the gating signal on path 2040 is high, multiplexer 2042 preferably selects this input signal from flip-flop 2044, which provides a square wave output at one-half the frequency of clock A, and applies this signal to the output data line 2046 of multiplexer 2042. The other selectable input to multiplexer 2042 preferably is the serial data output of a conventional parallel-to-serial shift register 2050 which receives the 12 parallel lines of data output from FIFO memory 2016. When the gate signal on path 2040 is low, multiplexer 2042 preferably selects the serial data line 2048 output from shift register 2050 and applies this signal to the output data line 2046 of multiplexer 2042. Shift register 2050 is preferably a 14 line input parallel-to-serial shift register with two lines being grounded in the arrangemet to be described by way of example. If 14 input data lines were utilized then these two grounded terminals will, of course, be respectively connected to the other two of the 14 data input lines. Shift register 2050 receives the 12 lines of data from FIFO memory 2016 via path 2051, this data being loaded into shift register 2050 when a load command is received from bit counter 2030 on path 2032. Data is outputed from shift register 2050 as the serial data line 2048, the shift rate being preferably established by clock A. Preferably, 14 clock pulses occur to shift out 14 bits of data from shift register 2050 for each word loaded into shift register 2050. The data output of multiplexer 2042 is preferably supplied to a conventional sync combiner 2052 which also receives the composite sync signal via path 2023 from sync generator 2022.

Figure 1:
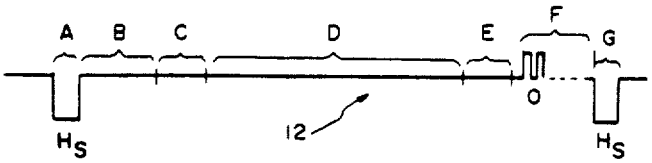
FIG. 1 is a diagrammatic illustration of a typical pseudo video scan line format in accordance with the present invention.
Figure 2:
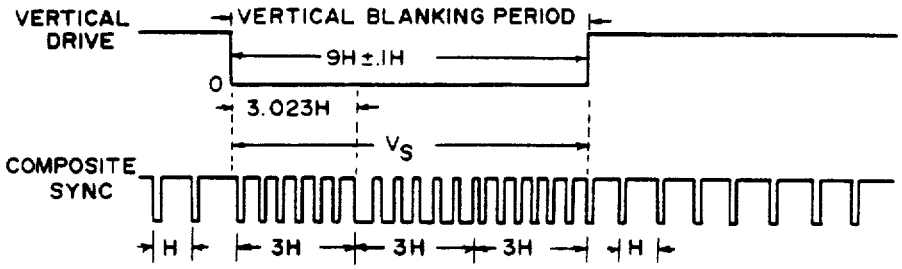
FIG. 2 is a graphical illustration of conventional vertical drive and composite sync signals illustrating the origin of the vertical sync signal in accordance with the present invention.

The output of sync combiner 2052 is a conventional composite video signal format, which is a three level signal, the data varying between levels 2 and 3 corresponding to digital values of 0 and 1 and the sync being indicated by level 1, as illustrated in FIGS. 1 and 2, with FIG. 1 illustrating a typical pseudo video scan line signal 12 format. This composite video signal represents a single pseudo video scan line at a time as described and shown in FIGS. 1 and 2, computer 2000 being conventionally programmed to control various locations or assignments in regions B through E of the pseudo video scan line, these regions to be described in greater detail hereinafter in the description of the receiver portion 28 of the row grabbing system 10. As was previously mentioned, region F of the pseudo video scan line 12 is provided on line 2040 as a sync burst gate provided to multiplexer 2042 and regions A and G are provided from the composite sync on path 2023.

The transmitter 20 also preferably includes a strobe control portion 2054 which contains all the logic for determining when the data should be strobed out of the FIFO memory 2016. It is most preferable that when data is shifted out of memory 2016 and transmitted, that complete lines of 40 characters each are shifted, in the example given. If all conditions necessary for the transmission of 40 characters in a pseudo video scan line 12 are not met preferably an empty line, which is a pseudo video scan line having only regions A,F and G occupied, is transmitted. It is further preferred that data be transmitted only during a selected portion of the television vertical frame so as to insure that only empty lines are transmitted during the vertical drive period. Strobe control portion 2054 preferably monitors the various conditions necessary and starts to issue a series of strobe out pulses on line 2056 only if the output of FIFO memory 2016 is ready as indicated on ready line 2058 provided from memory 2016 to strobe control portion 2054, if the vertical scan position is correct as indicated by a signal present on line 2060 termed frame enable, to be described in greater detail hereinafter, and if a composite sync pulse has been received from sync generator 2022 via path 2023. When all these conditions are met, the output of bit counter 2030 on line 2032 is allowed to control the strobing of FIFO memory 2016. The master reset pulse when issued or provided on line 2018 from computer 2000 preferably prevents any new pseudo video scan line of data from being transmitted until all the above mentioned conditions are again met. The correct vertical scan position or frame enable signal provided via path 2060 is preferably obtained from a decoder 2062 which decodes the output of a line counter 2064. Line counter 2064 counts the number of pseudo video scan lines after the vertical drive, the inputs to line counter 2064 being the vertical drive signal from sync generator 2022 provided via path 2025 and the composite sync signal from sync generator 2022 provided via path 2023. This decoder 2062 preferably selects the group of lines which are used for transmission.

DETAILED DESCRIPTION OF TRANSMITTER

Figure 15:
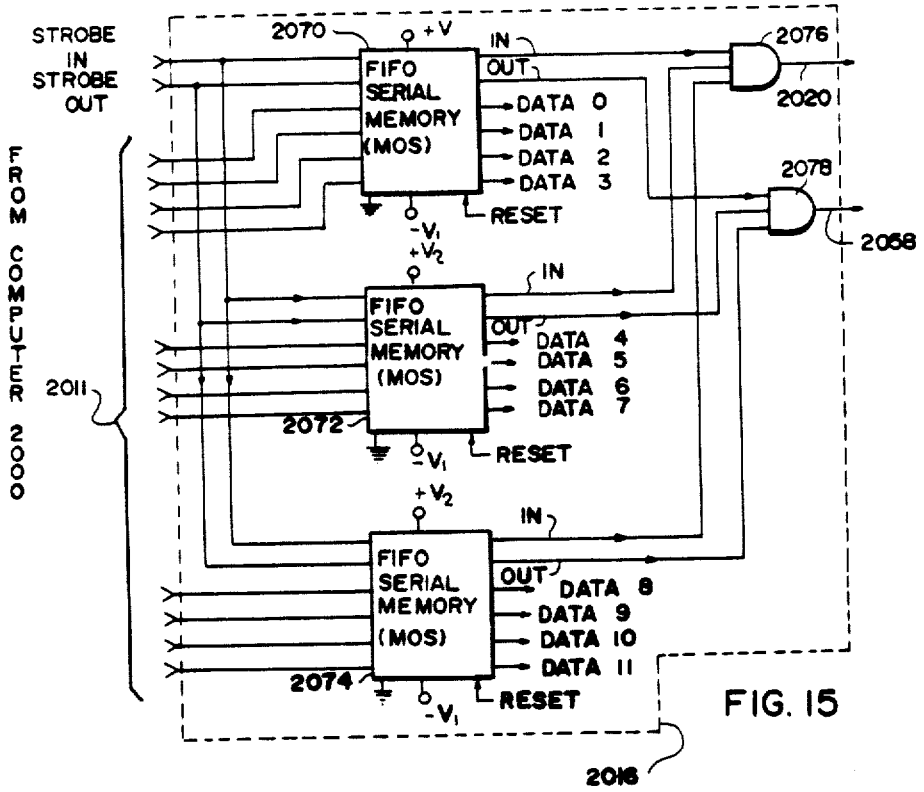
FIG. 15 is a logic diagram of the first in-first out memory portion of the transmitter portion illustrated in FIG. 14.
Figure 17:
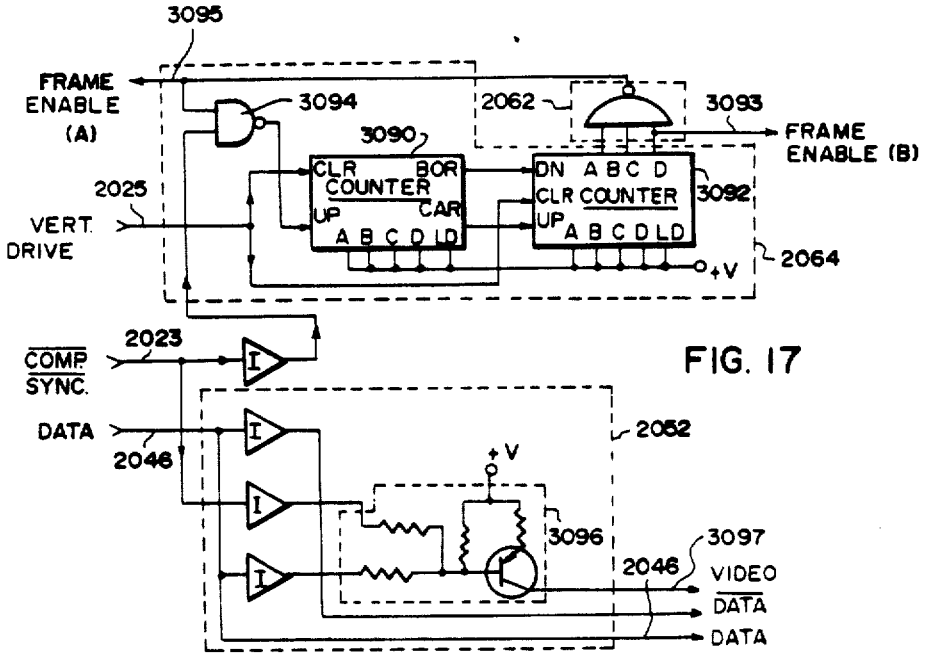
FIGS. 16 and 17 are logic diagrams, partially in schematic of the transmitter portion illustrated in FIG. 14 except for the first in-first out memory portion illustrated in FIG. 15.
Figure 16:
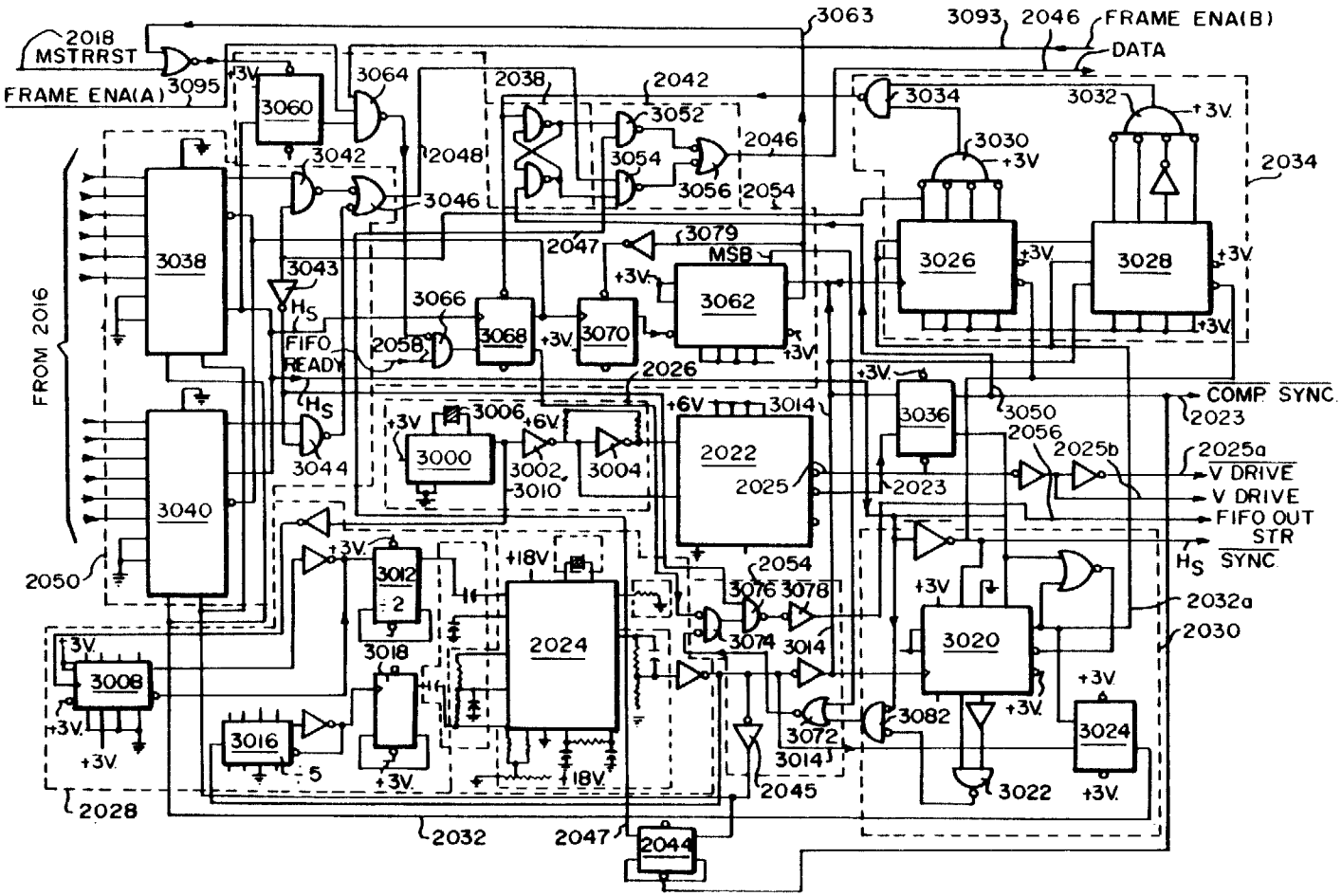

Referring now to FIGS. 15, 16 and 17, the transmitter portion 20 of the row grabbing system 10 of the present invention shall be described in greater detail, FIGS. 15 through 17 being logic schematics of appropriate portions of the transmitter portion 20, the balance of the transmitter portion 20 not illustrated in greater detail than in FIG. 14 being conventional. Accordingly, a more detailed description than previously provided will not be provided for those conventional portions not illustrated in greater detail in FIGS. 15 through 17 as they would readily be understood by one of ordinary skill in the art.

Referring initially to FIG. 15, the conventional FIFO memory 2016 is shown in greater detail. FIFO memory 2016 preferably comprises three conventional four bit-by-64 word FIFO serial memories 2070, 2072 and 2074, such as an MOS FIFO serial memory of the type manufactured by Fairchild under designation 33414, each memory stage 2070, 2072 and 2074 receiving four of the 12 parallel bit data line outputs from computer 2000. The input ready and output ready lines are preferably combined by NAND gates 2076 for the input ready line to provide the input ready signal via path 2020 to computer 2000, and by NAND gate 2078 for the output ready line to provide the output ready signal via path 2058 to strobe control portion 2054.

Referring now to FIGS. 16 and 17, the balance of the transmitter portion 20 shall be described in greater detail, where appropriate, for purposes of clarity. Referring initially to FIG. 16, the television sync generator 2022, as previously mentioned, is preferably a conventional MOS television sync generator such as the type manufactured by Fairchild under the designation 3261 and will not be described in any greater detail hereinafter. Oscillator 2026, which supplies the clock signal to the television sync generator 2022 for controlling the timing thereof and the reference frequency signal to the phase locked [group] *loop* 2024 [preferably], as previously mentioned, preferably comprises a conventional integrated circuit oscillator 3000, such as the type manufactured by Motorola under the designation 4024, utilized with inverters 3002 to 3004 to provide the clock to sync generator 2022 at opposite phases as is conventionally required by a sync generator 2022 of the type previously described. In addition, oscillator 3000 is preferably crystal controlled by a conventional crystal 3006 at the oscillator frequency, such as the 14.31818 megahertz frequency chosen by way of example. The clock signal output of oscillator 3000 is preferably applied via path 3010 to a conventional four bit binary counter 3008, such as the type manufactured by Texas Instruments under the designation SN 74161N, preferably connected as a divide-by-14 counter, counter 3008 forming a portion of the divide-by-14/5 divider network 2028. The output of counter 3008 is preferably connected as the clock input to a conventional divide-by-2 flip-flop 3012 also forming part of the divide-by-14/5 divider 2028. The output of the divide-by-2 flip-flop 3012 is preferably connected to one input of phase locked loop 2024 which is preferably a conventional MOS phase locked loop, such as the type manufactured by Signetics under the designation NE562B. Thus, the total division ratio from oscillator 2026 through phase locked loop 2024 is preferably 28-to-1. The output of phase locked loop 2024 provided via path 3014 is fed back to the input of a conventional four bit binary counter 3016, such as the type utilized for counter 3008, however counter 3016 preferably being connected as a divide-by-5 counter. The output of counter 3016 is preferably, in turn, connected to a conventional divide-by-2 flip-flop 3018, such as the type manufactured by Texas Instruments under designation SN 7474N, whose output is in turn preferably connected to a second input of phase locked loop 2024. Accordingly, the total feed back path division ratio is preferably 10 and the phase locked loop 2024, accordingly, varies its output frequency provided via path 3014 as necessary to keep its two inputs from flip-flop 3012 and flip-flop 3018 at exactly equal frequencies but with a phase difference of 90°. As a result of the frequency division ratio utilized on each input path to phase locked loop 2024, the phase locked loop output frequency is exactly preferably 5/14 of the frequency of oscillator 2026 which, by way of example, provides a clock A output frequency for phase locked loop 2024 of 5.1136357 megahertz as the output frequency of phase locked loop 2024.

Bit counter 2030 which, as previously mentioned with reference to FIG. 14, preferably receives this clock A output frequency, is preferably a conventional divide-by-7 bit binary counter 3020, such as the type manufactured by Texas Instruments under the designation SN74160N, counter 3020 which forms part of the bit counter network 2030 preferably being the actual bit counter. Two of the output lines of bit counter 3020 are preferably decoded by a conventional two input NAND gate 3022 to provide a pulse at the third count of counter 3020, this pulse being provided as one input to a two input negative NAND gate 3082. The carry output from bit counter 3020 is preferably connected to the D input of a conventional D type flip-flop 3024 whose clock input is preferably connected to the clock A output of phase locked loop 2024 provided via path 3014. This provides at the output of flip-flop 3024 a pulse at the completion of the divide-by-seven cycle of counter 3020 which pulse is utilized as the load input of the parallel-to-serial register 2050 provided via path 2032.

As was previously mentioned with reference to FIG. 14, the output of bit counter 2030 provided via path 2032 is also preferably provided to [charcter] *character* counter 2034. As shown and preferred in FIG. 16, character counter 2034, which is preferably a divide-by-40 counter, comprises two counter stages 3026 and 3028 which are both conventional four bit decade or divide-by-10 counters, such as the type manufactured by Texas Instruments under the designation SN74160N. Each counter 3026 and 3028 is preferably clocked from the master clock A via path 3014 and is enabled by the carry output of bit counter 3020 via path 2032. Thus the counter stages 3026 and 3028 preferably increment only once per character. The character counter 2034 also preferably comprises a decoder which includes negative NAND gates 3030 and 3032, connected, respectively, to the outputs of counter stages 3026 and 3028, and a NAND gate 3034 whose inputs are the outputs of gates 3030 and 3032. The decoder formed by gates 3030, 3032 and 3034 preferably generates a negative pulse on the 40th count from counter stages 3026 and 3028 of counter 2034. As shown and preferred, counter stages 3026 and 3028 are cleared by the composite sync signal provided from sync generator 2022. The composite sync output of sync generator 2022, as shown and preferred in FIG. 16, is provided to a conventional D flip-flop 3036, with the composite sync output of sync generator 2022 being provided to the D input thereof, flip-flop 3036 preferably being clocked by the master clock A provided via path 3014. As a result, the output of flip-flop 3036 is preferably exactly the same as the input composite sync from generator 2022 except that it is slightly delayed by a small fraction of the clock period, such as on the order of 50 nanoseconds, as necessary for transitions of the output to be exactly synchronized to the master clock frequency.

As was previously mentioned with respect to FIG. 14, multiplexer 2042 preferably receives as one selectable input, the output of a divide-by-2 flip-flop 2044 whose input is the master clock A output of phase locked loop 2024. As shown and preferred in FIG. 16, flip-flop 2044 is preferably a conventional flip-flop which has the inverted clock A signal supplied to the clock input thereof through inverter 2045 and which generates an output frequency of one-half the clock A frequency via path 2047 to multiplexer 2042. The other selectable input to multiplexer 2042, as was previously mentioned with respect to FIG. 14, is the serial data output of parallel-to-serial register 2050 provided via path 2048. As shown and preferred in FIG. 16, parallel-to-serial register 2050 preferably comprises two shift register stages 3038 and 3040, such as the type manufactured by Texas Instruments under designation SN74166N, which are preferably loaded in parallel and are shifted out alternately, first seven bits being provided from one stage and then seven bits being provided from the other stage. The outputs of shift register stages 3038 and 3040 are preferably alternately selected by NAND gates 3042 and 3044. Preferably, the least significant bit of decade counter 3026 of character counter 2034 is supplied to one input of NAND gate 3042 and is applied inverted through inverter 3043 to one input of NAND gate 3044. This signal preferably alternates at the character rate and selects which NAND gate 3042 or 3044 is on. The outputs of NAND gate 3042 and 3044 are connected as the two inputs to a negative NOR gate 3046 and, accordingly, alternate groups of seven data bits appear at these two inputs and a continuous stream of data bits is, therefore, present at the output of gate 3046 via path 2048 to multiplexer 2042.

As was previously mentioned with reference to FIG. 14, the switching of multiplexer 2042 is preferably accomplished by flip-flop 2038, which is preferably a conventional RS flip-flop which is set by the composite sync on one input via path 3050 and is reset by the output of NAND gate 3034 of character counter 2034 which is the character 40 pulse. As shown and preferred in FIG. 16, multiplexer 2042 comprises NAND gates 3052 and 3054 whose outputs are connected to negative NOR gate 3056. The selected data exists on output line 2046, gate 3052 and 3054 being supplied from opposite outputs of flip-flop 2038 so that one of these two gates is on when the other is off and vice-versa.

Now referring to the strobe control logic 2054, this logic preferably includes a conventional flip-flop 3060 which is cleared by the master reset signal provided via path 2018 from computer 2000 or by an output pulse from a conventional counter 3062, to be described in greater detail hereinafter, contained within the strobe control logic 2054, provided via path 3063. Flip-flop 3060 is preferably set by the horizontal sync. The output of flip-flop 3060 is preferably connected to one input of a three input NAND gate 3064 whose two other inputs are provided from the frame enabling circuit or decoder 2062, to be described in greater detail hereinafter with reference to FIG. 17. The output of NAND gate 3064 will preferably be low during frame enable if flip-flop 3060 is set. This output is preferably combined with the FIFO ready signal in a negative NAND gate 3066 whose output will be high only if FIFO memory 2016 is ready as indicated by the FIFO ready signal provided via path 2058, both frame enable signals are asserted and a horizontal sync pulse has been received since the last or previous transmission, as indicated by an output being provided from NAND gate 3064 to negative NAND gate 3066. If all these conditions are met, gate 3066 will provide an output signal to the D input of another conventional flip-flop 3068 which will be set at the start of the next horizontal sync pulse present at its clock input. When flip-flop 3068 is set, this signifies that the system is ready to start transmitting a pseudo video scan line. The output of flip-flop 3068 is preferably connected to the clock input of another flip-flop 3070 which is, accordingly, set at the time that flip-flop 3068 is set. When flip-flop 3070 is set, its output goes high enabling counter 3062 which then starts to count under control of the master clock A, provided via path 3014, which is supplied at its clock input. Counter 3062 is preferably a conventional four bit divide-by-16 counter, such as the type manufactured by Texas Instruments under the designation SN74163N. When counter 3062 counts to 8, its most significant bit goes high which supplies a high level signal via path 3071 to one input of a conventional two input NOR gate 3072. Gate 3072 then provides an output signal to a two input negative NAND gate 3074 which, in turn, provides an output signal to a two input NAND gate 3076 whose output is, in turn, inverted through an inverter 3078 to provide the FIFO [out] strobe *out* signal via path 2056 to FIFO memory 2016. When counter 3062 counts to 15, its carry output preferably goes high and is fed back to flip-flop 3070 via path 3079 to clear it which in turn clears counter 3062 ending its count cycle. Thus, counter 3062 preferably supplies a single FIFO strobe out pulse to FIFO memory 2016 via path 2056 in the manner previously described at the beginning of a pseudo video scan line. The purpose of this is to preferably preload FIFO memory 2016 with the first valid word before transmission starts. Subsequent FIFO strobe out pulses are obtained from a negative NAND gate 3082 which generates a strobe out pulse when a negative pulse is present to gate 3082 from decoder 3022, which was previously described with reference to bit counter 2030, as long as a horizontal sync pulse is not present at its other input, the output of gate 3082 being the other input to NOR gate 3072. The second input to negative NAND gate 3074 is preferably supplied from the negative output of flip-flop 3068 which preferably inhibits a strobe pulse after 40 characters have been transmitted. The other input to NAND gate 3076, which is supplied from the counter stage 3026 through inverter 3043 to NAND gate 3076, preferably inhibits alternate pulses, pulses at the other input of NAND gate 3076 provided from the output of negative NAND gate 3074 occurring once per character whereas a FIFO strobe out pulse is needed only once per two characters, which is once per word.

Referring now to FIG. 17, the sync combiner 2052, frame enable decoder 2062 and line counter circuit 2064 shall be described in greater detail hereinafter. The line counter 2064 preferably comprises two four bit binary counter stages 3090 and 3092, such as the type manufactured by Texas Instrument under the designation SN74193L. Counter stages 3090 and 3092 are preferably initially cleared by the vertical drive signal from sync generator 2022 provided via path 2025 and are clocked by the composite sync signal from sync generator 2022 provided via path 2023 via a conventional two input NAND gate 3094, the other input to NAND gate 3094 being the frame enable A signal output of decoder 2062 provided via path 3095. Clocking of counter stages 3090 and 3092 preferably continues until count 224 at which time decoder 2062, which is preferably a three input NAND gate, generates a low output via path 3095 turning off NAND gate 3094, NAND gate 2062 being the decoder which provides the frame enable signals via path 3095 and 3093, the frame enable signal provided via path 3093 being provided in parallel from one input to NAND gate 2062 from counter stage 3092 of line counter 2064.

Sync combiner 2052 which ultimately combines the composite video output pseudo video scan line signal 12, is preferably a conventional sync combiner as shown and preferred in FIG. 17, and has a data input via path 2046 and a composite sync input via path 2023, each of these inputs supplying current drive to a conventional transistor 3096 such that the collector output via path 3097 of transistor stage 3096 has a current determined by the combination of input logic levels and has three output levels corresponding to three signal levels, data varying between levels 2 and 3 corresponding to digital values of 0 and 1 and sync being indicated by level 1, this composite video signal output of path 3097 representing one pseudo video scan line at a time as described and shown with reference to FIGS. 1 and 2. This is the video signal transmitted from transmitter 20 to RF modulator 24 and therefrom through the cable distribution network 22 from which it is ultimately demodulated and provided to receivers 28 for processing and ultimate provision to the video display devices 2013 and 2015 for display of the selected or grabbed frame as well as row-by-row update of the selected frame.

RECEIVER

General Description

Referring now to FIGS. 3 through 7, initially, and once again to FIGS. 1 and 2, the preferred receiver portion 28 of the row grabbing system 10 of the present invention shall generally be described in greater detail. Thereafter, with reference to FIGS. 8 through 14, the preferred receiver portion 28 of the present invention shall be described in greater detail. As was previously described with reference to the preferred transmitter portion 20 of the row grabbing system 10 of the present invention, the transmitter 20 preferably provides what is generally termed a pseudo video scan line such as the type 12 illustrated in FIG. 1. This pseudo video scan line 12, as was previously described, is identical in format to a conventional video scan line; that is, it is consistent with FCC and EIA standards for a video scan line signal format; however, this pseudo video scan line 12 actually contains a row of information, such as approximately between 11 and 13 actual television video scan lines of information with the transmission time of the pseudo video scan line 12 being equal to the transmission time of a conventional TV video scan line, which is approximately 63 microseconds. With respect to the pseudo video scan line 12, the horizontal sync and vertical sync portions are identical to a conventional video signal as is the format for the horizontal sync and the vertical sync as well as the horizontal sync amplitude. The time and amplitude envelope of the video region of the pseudo video scan line 12, which region is defined as areas B,C,D,E and F in FIG. 1 is identical with the format for a conventional video scan line as is the three dimensional frequency envelope. Thus, all of the above mentioned standard conditions for a conventional video scan line signal are met by the pseudo video scan line 12 provided by the transmitter portion 20 of the row grabbing system 10 of the present invention and received by the receiver portion 28. Accordingly, any [euipment] *equipment* that can handle conventional video can handle the pseudo video scan line 12 of the present invention which can thus be transmitted and received through a conventional television distribution system with conventional television equipment.

Referring once again to the pseudo video scan line 12 illustrated in FIG. 1, the signal received by the receiver portion 28 and transmitted by transmitter 20 is in reality a digital signal which looks like a conventional video scan line to the receiver 28. The distribution of information in regions A through G of the pseudo video scan line, or row of information, illustrated in FIG. 1 is as follows. Region A represents the horizontal sync signal which starts the timing for the receiver 28 and indicates the beginning of the pseudo video scan line from the beginning of the horizontal sweep for a conventional television scan line. Region B represents the pseudo video scan line 12 address which contains all the following information bit locations. It should be noted, that preferably a 1 is indicated by the presence of a pulse and a 0 is indicated by the absence of a pulse, such as illustrated in FIG. 1 in region F where 1-0-1 is illustrated. When data is transmitted, as was previously mentioned, all of the following information bits are present; group, which is the section or chapter including a predetermined number, such as 1,000, of pages and is the most significant bit of the page address, page which represents one frame in a group; and row which occupies one character space which is preferably seven bits, and defines a portion of a page preferably containing approximately 11 to 13 scan lines which comprise one displayable character height. Region B also preferably contains direct address information, which is the first transmitted bit preferably and is a 0 unless the direct address condition exists which is a control condition for a selected terminal informing the terminal to supersede the requested page. This region also preferably contains permission information which is a one bit position which is preferably a 1 when the user is being given authority to receive one or more selected groups of information. It should be noted that preferably there is also an emergency override condition which provides control information to all terminals to override all requests including a permission request and occurs when the page and group information bit locations are 0, this condition preferably being utilized to display emergency information such as a civil defence warning Region C is preferably a special character information region of 7 bits which is preferably utilized for optional functions to be performed by the individual receiver 28 or terminal. Region D preferably contains 32 characters of displayable information in digital form. Region E preferably contains 7 bits of error check information and, preferably may represent the complement of the binary equivalent of the sum of all of the 1 bits present in regions B, C, and D. Region F preferably contains the clock synchronizing burst or pulse train at the bit rate (the frequency preferably being equal to one-half the bit-rate) and comprises a pulse train of ones and zeros of two character spaces or 14 bits. Region G is preferably the same as region A and represents the horizontal sync signal. As was previously mentioned, the vertical sync is provided by generating a special sequence of horizontal sync pulses during the normal television blanking period, which is after approximately 246 horizontal sync pulses, which in the present invention is after approximately 20 pages have been transmitted. Therefore, a 20 pages are transmitted before each vertical sync. The sync signal looks like a conventional composite sync signal with the vertical sync interval comprising approximately nine normal horizontal sync pulse times as illustrated in FIG. 2 which is an illustration of conventional composite sync and vertical drive signals.

Figure 4:
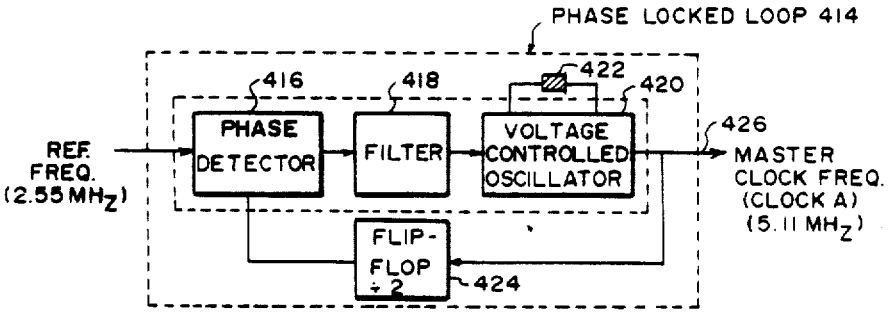
FIG. 4 is a block diagram of the phase locked loop portion of the arrangement illustrated in FIG. 3.
Figure 3:
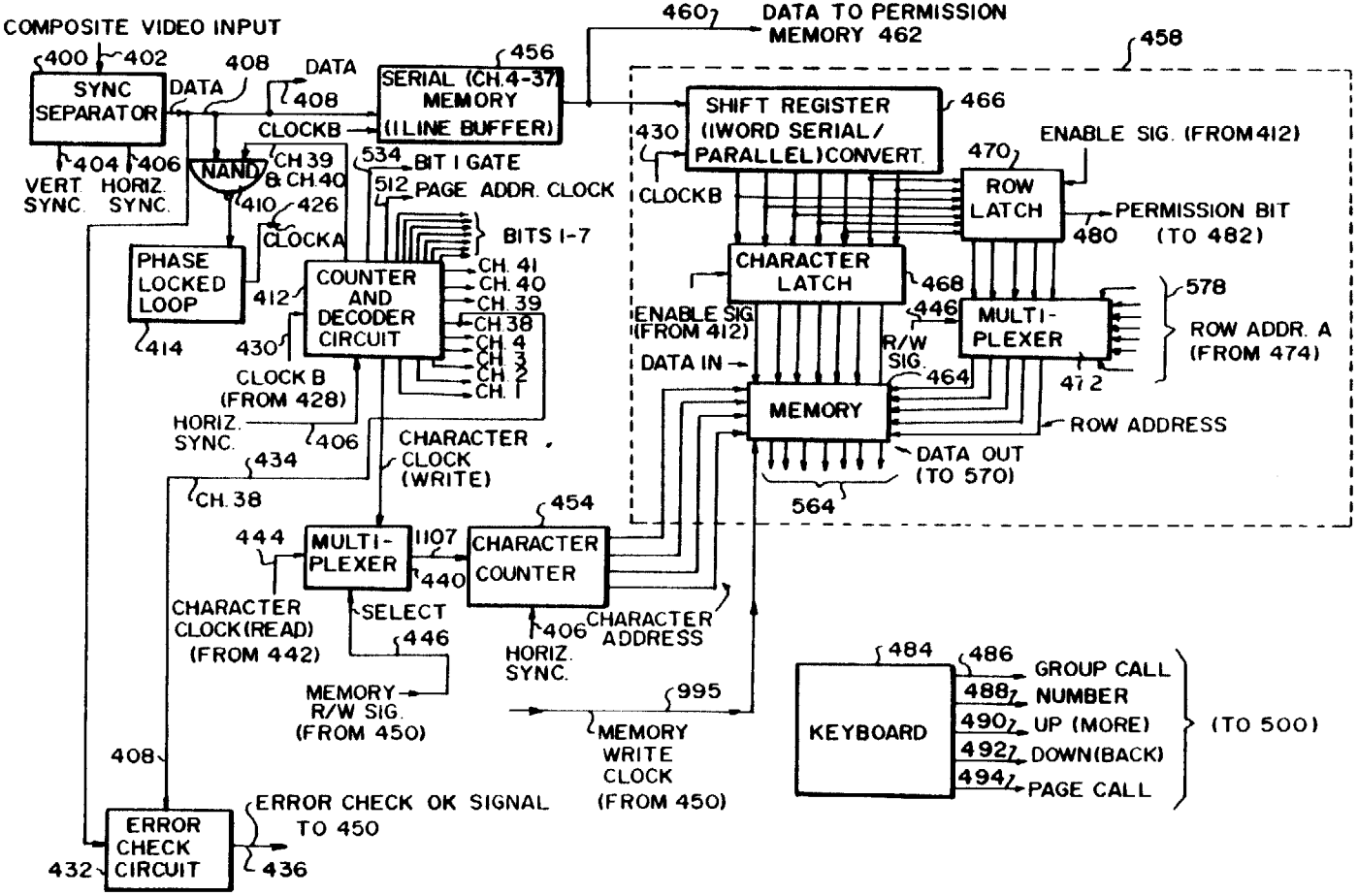
FIG. 3 is a [blcok] *block* diagram of the timing and keyboard control, memory input control and a part of the output processing portions of the preferred receiver of the present invention.

Now referring to FIGS. 3 and 4, the preferred synchronization and timing portion of the receiver portion 28 of the row grabbing system 10 of the present invention shall generally be described. The synchronization and timing portion preferably contains a conventional sync separator 400 which is provided in conventional fashion, through a conventional distribution system 22, with the composite video input via path 402 from the transmitter 20. As was previously mentioned, the composite video input provided via path 402 preferably includes data and horizontal sync information as well as vertical sync information at the appropriate given time. The conventional sync separator 400 separates the composite video input signal into a vertical sync signal via path 404, a horizontal sync signal via path 406 and a data signal via path 408, the data signal via path 408 preferably including regions B through F for a given pseudo scan line of information which is received via path 402 by the sync separator 400. The data portion of the pseudo of the pseudo video scan line 12 is provided in parallel as one input to a conventional two input NAND gate 410. The other input to NAND gate 410 preferably comprises the character 39 and the character 40 pulse output signals of a counter and decoder circuit 412 to be described in greater detail hereinafter with reference to FIG. 8. Suffice it to say at this time that an output is present to NAND gate 410 from the counter and decoder circuit 412 during the time interval corresponding to characters 39 and 40, as will be described in greater detail hereinafter. The output of NAND gate 410 is provided to a conventional phase locked loop 414, to be described in greater detail hereinafter with reference to FIGS. 4 and 8. Suffice it to say that phase locked loop 414 is preferably a correctable voltage controlled oscillator which operates without any additional input, as illustrated in FIG. 4, at the data bit rate, which is preferably, by way of example, approximately 5.11 megahertz, and is preferably crystal controlled. As illustrated in FIG. 4, the phase locked loop 414 preferably comprises a conventional phase [dectector] *detector* 416, a conventional filter 418 connected to the output of the phase detector 416 and a conventional voltage controlled oscillator 420 which is conventionally crystal controlled by crystal 422 which is connected to the output of filter 418. In addition, a feedback path is conventionally provided between the output of voltage controlled oscillator 420 and the phase detector 416 through a conventional divide-by-two flip-flop 424. Thus, a reference frequency, which is half the data bit rate is provided to the phase detector 416 and the output of the voltage controlled oscillator 420 is the master clock frequency, termed clock A at the data bit rate. By way of example, the reference frequency is approximately 2.55 megahertz and the clock A frequency is approximately 5.11 megahertz. Thus, the clock A output is provided via path 426 from the conventional phase locked loop 414.

Figure 6:
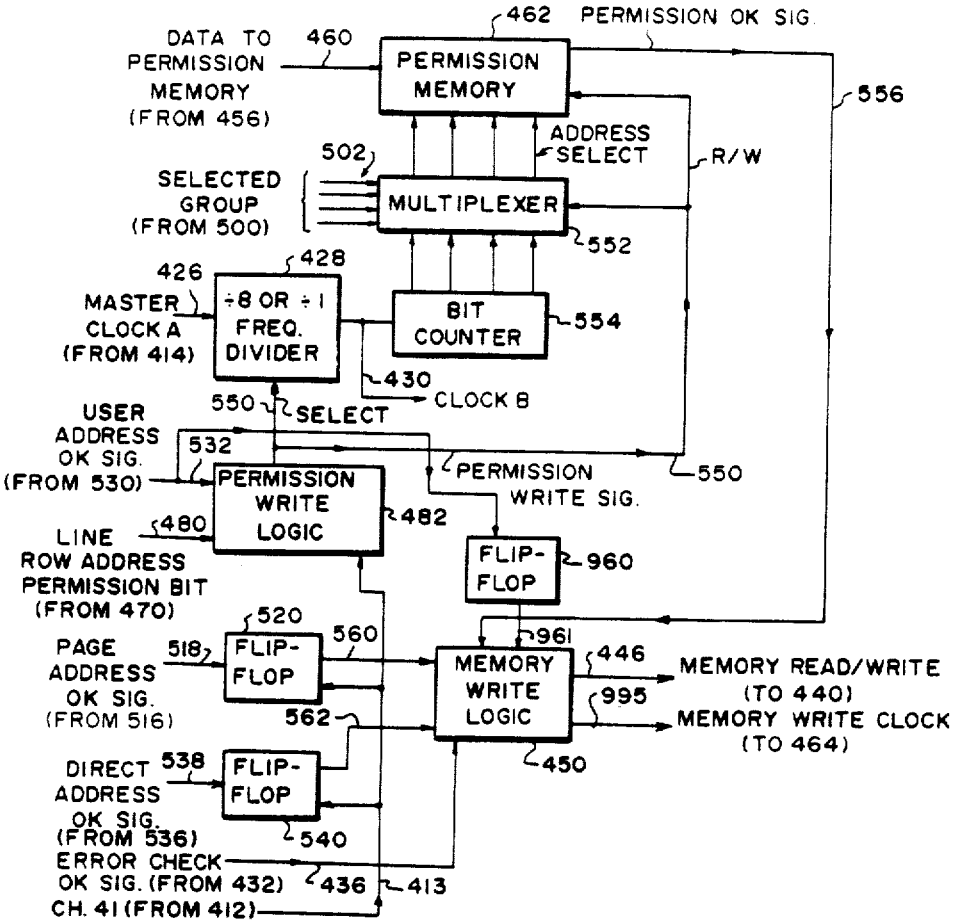
FIG. 6 is a block diagram of the memory and output processing portion of the preferred receiver of the present invention.

Referring once again to FIG. 3, the clock A output provided via path 426 is provided to a conventional selectable divide-by-8 or divide-by-1 frequency divider 428 (FIG. 6) whose output is either the clock A signal or the clock B signal which is the clock A signal divided by eight. Thus, for example, clock B is approximately 0.64 megahertz and is provided via path 430 (FIG. 6). This clock B signal provided via path 430 from selectable frequency divider 428 is preferably provided as an input to the counter and decoder circuit 412 which preferably decodes the character positions and the bits within the character by counting clock pulses starting with the end of the horizontal sync pulse, as will be described in greater detail hereinafter, seven counts preferably being provided per character. The horizontal sync input is also preferably provided to the counter decoder circuit 412 to start and/or reset the counters contained therein. The output of the counter and decoder circuit 412 is preferably the control information corresponding to character positions 1 through 41 and bits 1 through 7, by way of example. As was previously mentioned, the character position control information for character positions 39 and 40 is preferably provided as one input to the two input NAND gate 410. It should be noted that preferably character positions 39 and 40 are the 14 bits which comprise region F of the pseudo video scan line 12. Accordingly, NAND gate 410 only preferably provides an output to phase locked loop 414 when the data portion of the pseudo video scan line 12 is at region F so that only information contained in region F is provided to phase locked loop 414. As was previously mentioned, region F is the reference frequency which is one-half the data bit rate or one-half the master clock frequency which is supplied to the phase detector 416 which conventionally functions together with the feed back signal from the voltage controlled oscillator 420 as modified by the flip-flop 424 to provide a feedback frequency equal to the reference frequency which corrects the voltage controlled oscillator 420 if there is any difference, whether this difference be in frequency or phase. In addition, circuit 418 conventionally functions to stabilize the phase locked loop 414, the output of the phase locked loop 414 being a continuous clock signal which is twice the reference frequency and identical in phase. Preferably, the data bit rate is equivalent to twice the maximum frequency of transmission, with the highest frequency of transmission possible being two bits per cycle for a digital signal.

The data information portion of the pseudo video scan line 12 is also preferably provided in parallel to an error check circuit 432 which preferably receives control or timing information from the counter and decoder circuit 412 via path 434 corresponding to character position 38 as well as receiving data via path 408 from the sync separator 400. As was previously mentioned, character position 38 preferably corresponds to the error check information portion of the pseudo video scan line 12. Error check circuit 432, will be described in greater detail hereinafter with reference to FIG. 8 with respect to the presently preferred arrangement for accomplishing an error check. With respect to the arrangement illustrated in detail in FIG. 8, error check circuit 432 preferably counts the number of "one" bits in characters 1 through 7 which comprise regions B, C, and D, preferably, and compares that sum with the binary number located in character position 38, which corresponds to region E, and requires non-coincidence in every bit of that comparison since character position 38 or region E preferably contains the complement of that sum. Error check circuit 432 provides an output signal, such as a 1, indicating the error check is OK when the preferred error check condition exists, this signal being termed "error check OK signal" provided via path 436. This error check OK signal on path 436 will preferably remain until the next error check of the next subsequent pseudo video scan line which occurs one conventional television video scan line transmission time after the previous pseudo video scan line. The complement of this sum is preferably selected from an [erro] *error* check sum to allow a check for empty lines, which are lines that only contain information in regions F and G which, in such an instance, would sum to 0. If the complement was not utilized for the error check sum in region E, such a signal would pass the error check since the sum would be 0 and character position 38 would contain a 0 so the sum would match. Therefore, by utilizing the complement, empty line signals would be rejected, which is preferred in the present invention.

The output of the counter and decoder circuit 412 also preferably comprises a character clock signal for the main memory write mode, as will be described in greater detail hereinafter with reference to FIG. 8, which is provided to a conventional two bit multiplexer 440 which also receives as inputs a character clock signal in the main memory read mode from a column counter 442 (FIG. 7) to be described in greater detail hereinafter, via path 444, and a select input via path 446 which signal selects between the character clock input in the write mode and the character clock input in the read mode in response to the provision of a memory read/write signal from memory write logic 450 (FIG. 6), to be described in greater detail hereinafter, via path 446. Preferably, in response to a memory write command which is provided from the memory write logic 450 via path 446, the character clock input selected by multiplexer 440 is the signal provided from the counter and decoder circuit 412, whereas in response to a memory read command provided from the memory write logic 450, the character clock input selected by multiplexer 440 is the character clock provided from column counter 442. The character clock input selectively provided from multiplexer 440 is used to clock a character counter 454, to be described in greater detail hereinafter with reference to FIG. 12, which also receives the horizontal sync input to start and/or reset the counter 454. The output of the character counter 454 is the character address. The data portion of the pseudo video scan line 12 provided via path 408 is also provided in parallel to a conventional serial memory 456 which is a one line buffer which preferably delays the signal by one conventional television video scan line transmission time (preferably for character positions 4 through 37, by way of example) before the provision of the data to a main memory portion 458 to be described in greater detail hereinafter. This delayed data is also provided in parallel via path 460 to a permission memory 462 (FIG. 6), to be described in greater detail hereinafter. This one conventional television video scan line transmission time delay enables the testing, to be described in greater detail hereinafter, of the pseudo video scan line 12 for purposes of deciding whether or not to write this information into a main memory 464 of the main memory portion 458 prior to the actual writing of the data into this main memory 464. The actual generation of the read/write command to the main memory 464 will be described in greater detail with reference to FIGS. 5 and 6.

With reference to the main memory portion 458 of FIG. 3, the serial memory 456 preferably has a 256 bit capacity and serially loads these bits one character or seven bits at a time into a conventional shift register 466, which is a one word serial-to-parallel converter which comprises a conventional seven bit shift register which parallel unloads seven bits into a character latch 468, to be described in greater detail with reference to FIG. 12 or into a row latch 470 to be described in greater detail hereinafter with reference to FIG. 12, depending on the particular character position. As was previously mentioned, preferably characters 4 through 37 which represent, preferably, regions B, C, and D of the pseudo video scan line 12 are loaded into the serial memory 456. Preferably, character latch 468 and row latch 470 are enabled by enable signals provided from counter and decoder circuit 412 at the appropriate times. Preferably, row latch 470 receives character position 4 information, which preferably comprises the row information and character latch 468 preferably receives character positions 6 through 37, which comprises region D, which preferably is the character or displayable data information. Preferably, as was preferably mentioned, the special character is located at character position 5 and is not unloaded to character latch 468. In addition, shift register 456 receives the clock B input signal as a clock signal therefor. The output of character latch 468 preferably provides a displayable data input in parallel to memory 464 one character at a time or seven bit parallel. In the memory write mode, row latch 470 will preferably provide the row address in parallel to memory 464 for a given pseudo video scan line 12, which row address is preferably set once per pseudo video scan line 12. In the memory write mode, the row latch 470 output is provided to a conventional multiplexer 474 which switches the address input of memory 464 to the output of row latch 470. In the memory read mode, multiplexer 472 siwtches the row address input of memory 464 to the output of row counter 474 (FIG. 7), to be described in greater detail hereinafter. Preferably, five bits of row address are utilized which is adequate for providing address information for 32 video displayable rows. As was previously mentioned, the main memory 464 address input identifies the character address or character position which is provided from the output of character counter 454, which is preferably a five bit counter capable of supplying 32 character addresses utilizing the character clock input (one clock per character) and the horizontal sync to provide the character addres. Accordingly, memory 464 is preferably, by way of example, a row-by-32 character array or page, of which 16 or 32 rows may be utilized. Memory 464 receives a read or write command via path 446 from memory write logic 450 (FIG. 6), as will be described in greater detail hereinafter. It should be noted that preferably four bits are utilized to assign 16 rows and one bit is utilized to assign a left control condition and a right control condition if 64 characters are to be displayed instead of 32 characters, assuming a page has normally been defined as 32 characters wide by 16 rows high, 64 characters representing two pages. It should also be noted that row latch 470 also provides a permission bit output via path 480 to the permission write logic 482 (FIG. 6), to be described in greater detail hereinafter.

Preferably, as was previously mentioned, the group and/or page to be displayed or grabbed in real time is selected by means of a conventional keyboard 484, to be described in greater detail hereinafter. Suffice it to say at this time that keyboard 484 is preferably a conventional ten digit keyboard which provides a serial digital output. For example, if decimal 326 is the number depressed on the keys of the keyboard 484, then keyboard 484 will conventionally put out a pulse train of 326 pulses. The outputs from keyboard 484 are preferably the control signal "group call" provided via path 486, the "number" selected provided via path 488, the control condition "up" or more provided via path 490 which represents incrementing the selected number by one preferably; the control condition "down" or back provided via path 492 which preferably represents decrementing the selected number by 1; and the control condition "page call" provided via path 494, the control conditions up and down incrementing or decrementing the group or page selection depending on which condition, group or page, was most recently selected. This keyboard 484 output via paths 486 through 494, inclusive, is preferably provided to a [key board] *keyboard* counter 500 (FIG. 5), to be described in greater detail hereinafter, where this information is interpreted to control the selection of the appropriate frame to be grabbed in real time.

Figure 5:
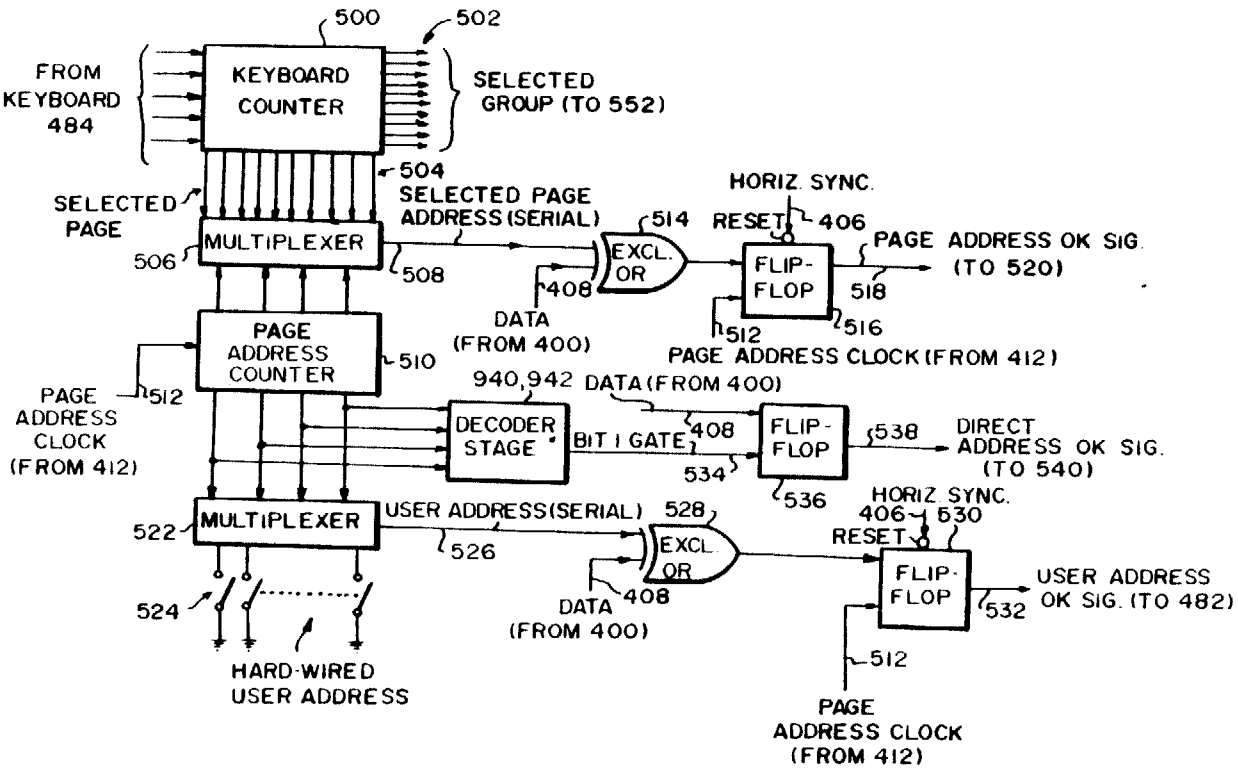
FIG. 5 is a block diagram of another portion of the memory input control portion of the preferred receiver of the present invention.

Referring now to FIGS. 5 and 6 the generation of the memory read/write command provided via path 446 and a memory write clock provided via path 995 from memory write logic 450 shall generally be described. As was previously mentioned, the output of keyboard 484 is provided to keyboard counter 500, to be described in greater detail hereinafter, which counts the pulse train corresponding to the number selected and provides a parallel binary output, such as preferably 10 bits, for both the group selected via parallel paths 502 and for the page selected via parallel paths 504, and increments or decrements the appropriate counter in response to the receipt of the up or down control signal from the keyboard 484. The selected page output 504 from keyboard counter 500 is preferably provided in parallel to a conventional multiplexer 506 which sequentially switches each parallel output 504 to a single output line 508 to provide a serial selected page address on path 508. Multiplexer 506 is addressed to switch by a page address counter 510 to be described in greater detail hereinafter with reference to FIG. 10, which is in turn operated by the page address clock provided via path 512 from counter and decoder circuit 412 (FIG. 3), this page address clock preferably being 10 bits or pulses which correspond to the page address bits. The output of the page address counter 510 is preferably a binary number representing the bit number within the page address sequence and controls the switching of multiplexer 506. Multiplexer 506 and page address counter 510 are preferably equivalent to a 10 bit parallel load/-serial out shift register. The page address counter 510 and multiplexer 506, as will be described in greater detail hereinafter, permit the page address to be checked. In order to accomplish this, the serial page address output on path 508 is provided as one input to a conventional exclusive or gate 514 whose other input is the page address bit present on the data line 408, the serial page address bits on path 508 being provided in coincidence with the page address bits on data line 408. When the pseudo vidso scan line page address on data line 408 is the same as the serial page address on path 508, the output of exclusive or gate 514 will be low, which in the logic chosen by way of example represents a 0. When these inputs differ, in other words when there is a lack of coincidence, the output of exclusive or gate 514 will be high (a 1 in the logic chosen) for at least one clock period of the page address sequence. The output of exclusive or gate 514 is provided to a conventional flip-flop 516 which, when the output of 514 is high, will be clocked by the page clock provided via path 512. Flip-flop 516 is preferably a conventional JK flip-flop. If at any time during the page address sequence, the output of 514 goes high, the output of flip-flop 516 will preferably go low and provide no output and remain low until reset by the horizontal sync at the end of the pseudo video scan line 12. The normal condition of the output of flip-flop 516 provided via path 518 is a high or 1 indicating that the page address is OK or checks, this signal being termed the "page address OK signal" which is provided to another conventional flip-flop 520 (FIG. 6) which supplies this information to the memory write logic 450.

Now considering the provision of a user address check to insure that the correct user is receiving the pseudo video scan line. The page address counter 510 output is also provided in parallel to multiplexer 522 whose other input is a hard-wired user address 524. The user address perferably occupies the same space in the pseudo video scan line as the page address and, accordingly, the receiver 28 must preferably be able to distinguish between the two. The page address counter 510 output sequentially switches multiplexer 522 to provide a serial bit user address on path 526 to EXCLUSIVE OR GATE 528 whose other input is the data path 408. The serial user address provided via path 526 is in coincidence with the user address bits provided via path 408 to gate 528. When the pseudo video scan line user address provided via path 408 is the same as or coincident with the user address provided via path 526, the output of gate 528 will be low for the logic chosen by way of example. When there is a lack of coincidence between these two inputs to gate 528, the output of gate 528 will be high for at least one clock period of the user address sequence. The output of gate 528 is preferably provided to a conventional JK flip-flop 530 which is preferably clocked by the page address clock provided via path 512. If at any time during the user address sequence, which is preferably identical with the page address sequence, the output of gate 528 goes high, the output of flip-flop 530 will preferably go low (a no output condition) and remain low until reset by the horizontal sync, provided via path 406, at the end of the pseudo video scan line. The normal condition of the output of flip-flop 530 is preferably high on path 532 indicating that the user address checks or is OK, indicated by the term "user address OK signal" which is provided as one input to the permission write logic 482 (FIG. 6). The user address O.K. signal is also provided to memory write logic 450 through a flip-flop 960, via path 961, which preferably introduces a one scan line delay.

Now considering the direct address condition we refer once again to FIG. 5. As was previously mentioned, the first bit of the address in region B of the pseudo video scan line 12 is preferably the direct address bit. A bit one gate signal is provided as an output from a decoder 940,942 (FIG. 10) via path 534 and is termed the "bit one gate" output. This output is provided to a conventional flip-flop 536 which senses whether this signal is a 1 or 0. Flip-flop 536 provides an output signal "direct address OK" on path 538 when the first bit is a 1. The data line input from sync separator 400 provided via path 408 is provided to flip-flop 536 which is clocked by the bit one gate output on path 534 from decoder 412. The output of flip-flop 536 provided via path 538, which output is termed the direct-address-OK-signal when a direct address condition is present, is preferably provided to another conventional flip-flop 540 (FIG. 6) whose output is connected as one input to the memory write logic 450 to be described in greater detail hereinafter.

Figure 6A:
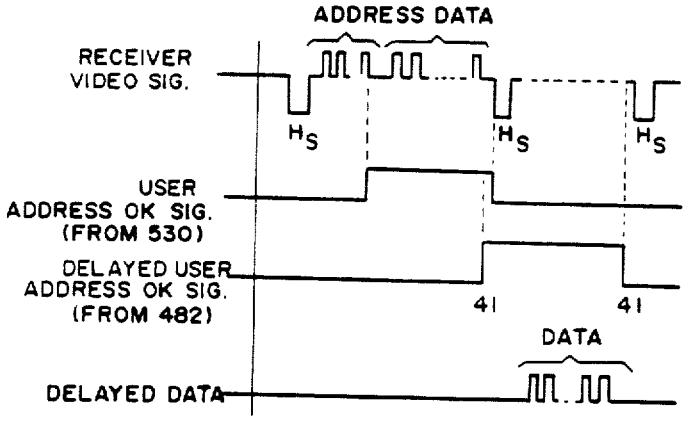
FIG. 6a is a graphical illustration of the timing associated with various signals in the arrangement of FIG. 6.

Referring now to FIG. 6, the generation of the read/-write main memory command via path 446, the main memory write clock via path 995 and the generation of the permission memory read/write command from the permission write logic 482 shall be described in greater detail hereinafter. As was previously mentioned, the permission bit of the row address position is provided via path 480 from the row latch 470 to the permission write logic 482, as is the user address OK signal on path 532 from flip-flop 530. Permission write logic 482 preferably stores the user address OK signal and delays it for one conventional television video scan line transmission time as illustrated in FIG. 6a. If the delayed user address OK signal is present at the same time the permission bit signal is present on path 480, permission write logic 482 preferably provides a permission write command signal via path 550 to the permission memory 462 and, in parallel, to a conventional multiplexer 552 as a select signal thereto. Permission memory 462 preferably receives data input via path 460 from the output of serial memory 456 (FIG. 3). In the write mode for the permission memory 462 via path 550, multiplexer 552 selects the address input for permission memory 462 from the parallel output of a bit counter 554 which provides one input to multiplexer 552, the other selectable input to multiplexer 552 being the selected group parallel bit output 502 of keyboard counter 500. The input to the bit counter 554 is the clock B output of the divide-by-8 or divide-by-1 frequency divider 428, with the divide-by-8 or divide-by-1 mode selected by the condition of line 550. In the permission write mode, frequency divider 428 is preferably set as a divide-by-8 counter so that the output in this mode is the clock B output comprising the clock A input divided by 8 or, in the example given, approximately 0.64 megahertz. This clock-A-divided-by-8 output of frequency divider 428 in this permission write mode is preferably also utilized as the clock input for the serial memory 456. As a result, the permission memory 462 address is preferably changed coincident with the shifting of the input data, both occurring at the reduced clock B rate. It should be noted that the permission bit only identifies one pseudo video scan line of data as a permission line but is not the actual permission indication, all data of that pseudo video scan line having the permission bit comprising the permission data or indication. It is this permission data which is provided to the permission memory 462 via path 460. The permission data provided via path 460 to permission memory 462 preferably contains information as to which group the user has permission to receive. Each bit of permission data pertains to a different group, preferably, and is stored in permission memory 462 addressable by bit. For example, if one starts counting with the beginning of the fifth character position, if the 24th bit in the pseudo video scan line obtaining permission information after the start of the count was a 1, that bit would be present at the input of permission memory 462 at the time that the address input to permission memory 462 was the binary number 24. Therefore, when in the permission read mode, if the address is 24, that would be output on line 556 as a permission OK signal. The above, is thus an example of giving permission for group 24. Preferably, the permission memory 462 is non-destructible and, is preferably constructed to operate at the reduced address rate, the clock-A-divided-by-8 rate being the preferred standard inexpensive MOS memory (for example a Signetics 2602B) operating rate. However, because of utilizing the reduced operating rate of clock-A-divided-by-8, it takes 8 pseudo video scan lines of time to perform this permission writing operation. This can, however, be conventionally scheduled by conventional programming of a computer to avoid any noticeable lag (due to interleaving) since any given terminal or receiver 28 does not normally receive all successive pseudo video scan lines as each successive scan line preferably pertains to a different page. For example, as previously mentioned, the sequence of transmission is preferably page 1, line 1, page 2, line 1, etc. until all the pages have line 1 thereof transmitted and then page 1, line 2, page 2, line 2, etc., until all the pages have line 2 transmitted and so forth until each line of each page has been transmitted. Thus, the pseudo video scan lines of one page are preferably interleaved with the pseudo [vido] *video* scan lines of another page so that a direct full-page-by-full-page transmission does not occur; rather the transmission is preferably one row per page at a time.

Now describing the permission read mode and referring once again to FIG. 6, the permission read condition on line 550 is the opposite condition from the permission write condition occurring on line 550. In the permission read mode, the selected group information 502 provided from keyboard counter 500 to multiplexer 552 is the address input which is provided to permission memory 462, this input 502 having been selected by multiplexer 552 which has been switched by the permission read signal appearing on line 550. If this address input 502 to permission memory 462 is a permitted group, then a permission OK signal, such as a 1, will be present on line 556. For example, if, as in the previous example, group 24 was selected, then a permission OK signal would be present on line 556. Accordingly, the operation of permission memory 462 is a conventional look-up table operation.

The page address OK signal present on path 518 is provided to flip-flop 520 to introduce a delay equivalent to the transmission time for one conventional television video scan line. Similarly, the direct address OK signal which would be present on line 538 is introduced to flip-flop 540 to introduce a delay equivalent to the transmission time for one conventional television video scan line. As shown and preferred in FIGS. 6 and 6a, all single television video scan line delay output transmissions provided by the permission write logic 482, flip-flop 520 and flip-flop 540 occur at the time of the occurrence of the character 41 timing signal from decoder 412. As is also shown and preferred in FIG. 6, the delayed page address OK signal flip-flop 520 output is provided via path 560 to the memory write logic 450, the delayed direct address OK signal output from flip-flop 540, when such a signal is present, is provided via path 562 to the memory write logic 450 and the delayed (one scan line) error check OK signal is provided via path 436 to the memory write logic 450. In addition, the permission OK signal is provided via path 556 to the memory write logic 450. As will be described in greater detail hereinafter, the main memory write command signal is provided to multiplexer 440 via path 446 when the error check OK signal is present on path 436 and either the direct address OK signal is present on path 562 or both the page address OK signal is present on path 560 and the permission OK signal is present on path 556. When these conditions are met, the memory write command signal is provided via path 446 to multiplexer 440.

Referring once again to FIG. 3, the provision of data 564 from main memory 464 as well as the loading of the main memory 464 shall be discussed. The main memory write clock signal provided via path 995 to main memory 464 preferably causes memory 464 to input data from the serial memory buffer 456 in the following write cycle. As was previously mentioned, the input data to memory 464 is one pseudo video scan line 12 of data. Serial memory 456 provides the data one character or seven bits at a time serial to shift register 466. Shift register 466 in turn provides this data to character latch 468 seven bits parallel. While the next seven bits of the next character are being shifted into shift register 456 from serial memory 456, the first seven bits previously loaded into the character latch 468 are loaded into the memory 464. This cycle continues preferably 32 times to load all characters of one row, which is a psuedo video scan line, into memory 464. At that time, the write cycle is complete. The write cycle begins anew when another main memory write clock signal is received by memory 464 and all other previously mentioned conditions are met.

In the read mode, a main memory read command signal is provided to multiplexer 440 via path 446. This memory read command signal condition is present on path 446 when the memory write command signal condition is not present as it represents the opposite conditions for line 446. The character address is provided from character counter 454 to main memory 464 in the same manner as previously discussed with respect to the write mode. Main memory 464 provides the parallel bit data output 564 to character generator 570 (FIG. 7), to be described in greater detail hereinafter, as addressed by row and character. This parallel bit data output 564 is preferably a seven bit parallel representation of alphanumeric characters, such as an ASCII code of both upper and lower case letters, or just upper case letters and special symbols for graphics or other purposes such as chemical symbols, stock market fraction symbols, etc.

Figure 7:
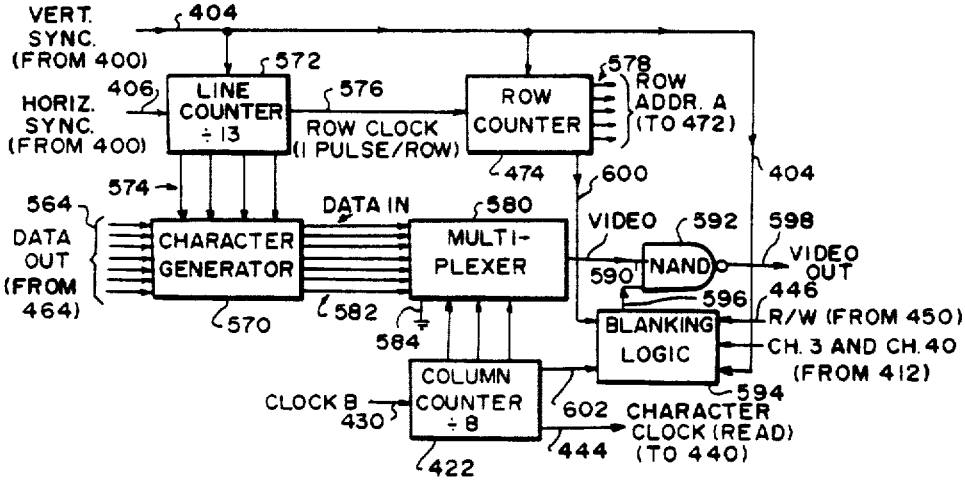
FIG. 7 is a block diagram of another portion of the memory and output processing portion of the preferred receiver of the present invention.

Now referring to FIG. 7, the display of decoded data such as characters and symbols shall generally be described. It should be noted that, preferably, the operation of the circuitry illustrated in FIG. 7 is preferably that of a conventional television digital display terminal. For purposes of discussion, it shall be assumed that a row of pseudo video scan line 12 contains 13 conventional television video scan lines of data, although, if desired, such a system could utilize 11 conventional television video scan lines or some other acceptable quantity. It should be noted that in the same time as 13 horizontal sync signals are received in the example given, 13-times-13 conventional television video scan lines are received, since each pseudo video scan line contains, in the example given, 13 conventional television video scan lines of information, the transmission time of a pseudo video scan line being equivalent to the transmission time of a conventional TV video scan line. However, since only 13 conventional television video scan lines can be displayed in this time interval, the receiver portion 28 receives 13 times as much information as can be displayed at any given time. The horizontal sync signal is provided via path 406 to a conventional divide-by-13 binary counter 572 which counts 13 horizontal sync signals in order to establish a row. Line counter 572 preferably provides a parallel bit output 574 representing the line number within a row as it counts and at the end of the 13th count provides a pulse via path 576, termed the row clock, to row counter 474 indicating the end of a row. This pulse via path 576 is, accordingly, used as a clock for row counter 474, the sequence being counter 572 counts to 13, advances one row and restarts counting to 13 again. Line counter 572 and row counter 474 are reset by the vertical snyc signal provided via path 404 from sync separator 400 each new vertical scan. The output 578 of row counter 474, as was previously mentioned, becomes the row address for main memory 464 in the read mode thereof through multiplexer 474 which switches the row address input from the row latch 470 to the row counter 474 in the main memory read mode so that correspondence between data in memory 464 and the vertical position on the video diplay screen is established.

The displayable character are preferably defined by the seven parallel bit output data 564 from main memory 464 and preferably each consist of a 7-by-9 character matrix which is nine matrix lines high by seven columns wide. Preferably, one additional blank column is provided in the displayable matrix so as to provide an 8-by-9 displayed matrix. The displayable characters are conventionally generated by defining a 1 or a 0 to each of the 63 points in the 7-by-9 character matrix. The output of the character generator 570 is seven lines corresponding to seven bits of one matrix line of the 7-by-9 character matrix. The line address 574 provided to the character generator 570 from line counter 572 conventionally determines which of the nine matrix lines in the 7-by-9 character matrix is presented at the output of character generator 570. This output is provided to a conventional multiplexer 580 which sequentially switches along the parallel inputs 582 from character generator 570, plus one grounded input 584 which allows for the blank column to provide an eight bit wide displayable matrix as discussed above, to provide a serial output of one matrix line in the 8-by-9 displayable matrix, the eight column being blank in order to allow for spacing between characters. Multiplexer 580 is preferably operated by column counter 442 which is a divide-by-8 conventional counter which is clocked by clock B. Column counter 442 preferably counts clock B pulses for 8 bits which is the width of the displayable matrix. It should be noted that all characters in a row preferably have the same character matrix line addressed first before the next character matrix line of that row is addressed. In other words, matrix line 1 for each of the 32 characters in a row is addressed first before matrix line 2 of any of the characters is addressed, and so forth. Column counter 442, as was previously mentioned, also provides the character clock via path 444 to character counter 454 through multiplexer 440 in the memory 464 read mode.

The serial output of multiplexer 580 is a true displayable video character, this character not being a true displayable video signal until output from multiplexer 580. The output of multiplexer 580 provided via path 590 is preferably the only true video present during the times corresponding to the 32 characters of width and the 16 rows of height preferably comprising a page. During the time outside this region or envelope there is an undesirable information content for conventional purposes. Therefore, it is preferably desired to eliminate this undesirable content. Accordingly, the video output signal of multiplexer 580 provided via path 590 is supplied to one input of a two input conventional NAND gate 592. A conventional blanking logic arrangement 594, to be described in greater detail hereinafter, supplies the other input to NAND gate 592 via path 596 to provide an enabling gating signal to NAND gate 592 to allow the video signal output present on path 590 to be provided via path 598 to the video display device 2013, 2015 conventional video circuitry only during the time corresponding to valid characters as a function of horizontal and vertical position. Blanking logic 594 is controlled in response to the vertical sync provided via path 404 from sync separator 400, to the row counter 474 via a signal provided via path 600 to blanking logic 594, a signal provided from column counter 442 via path 602 to blanking logic 594. The character 3 and character 40 output signals from decoder 412 which are provided at the times of the occurrence of the third character and the fortieth character in the pseudo video scan line 12 and the main memory read write command signal provided from the memory write logic 450, this command signal turning off the video during the write mode of the memory 464.

DETAILED DESCRIPTION OF RECEIVER

Referring now to FIGS. 8 through 14, which are logic schematics of the various portions of the receiver 28, the receiver portion 28 shall be described in greater detail, where necessary, with respect to structure and operation.

Figure 8:
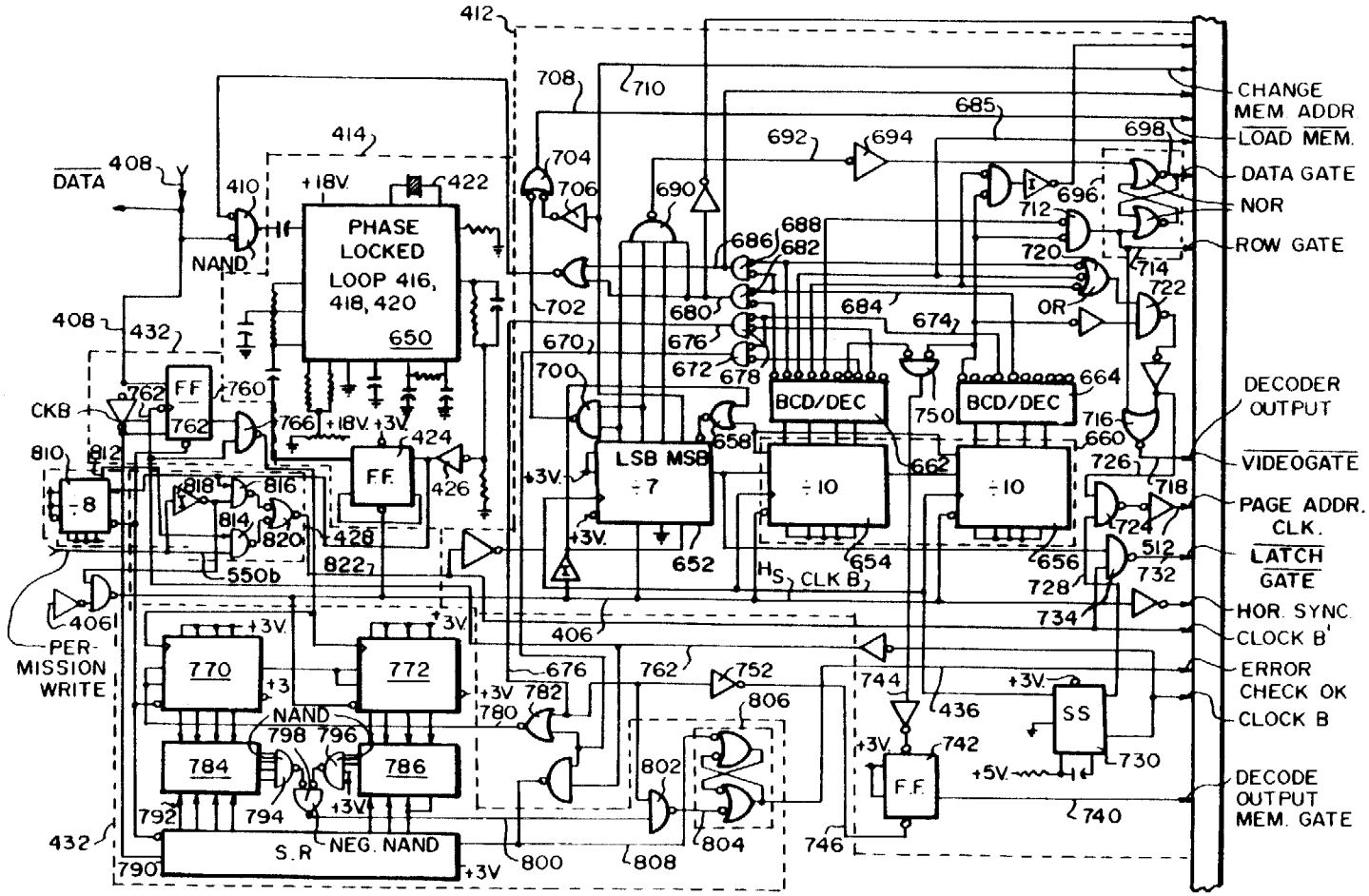
FIG. 8 is a logic diagram, partially in schematic, of a portion of the timing and keyboard control portion of the preferred receiver of the present invention illustrated in FIG. 3.

Referring now to FIG. 8, a logic schematic of the circuitry generally shown in block form in FIGS. 3 and 4 is shown. Referring initially to the phase locked loop 414, the phase detector 416, filter 418 and voltage control oscillator 420 are preferably formed on a conventional MOS integrated circuit 650, such as a Signetics NE 562b phase locked loop chip, with flip-flop, 424 and crystal 422, which is preferably a 5,113,636 hertz crystal for the frequency utilized in the example given, being conventionally connected to appropriate circuit connections on chip 650.

Referring now to the counter and decoder circuit 412, illustrated in greater detail in FIG. 8, the generation of the various appropriate character position timing signals shall be described in greater detail. Decoder circuit 412 preferably comprises three four bit decade counters 652, 654 and 656, with decade counter 652 preferably being conventional arranged as a divide-by-7 counter and with counters 654 and 656 being conventionally arranged as divide-by-10 counters. These counters 652, 653, and 656 are preferably conventional decade counters, such as the type manufactured by Texas Instruments under designation SN74160N decade counters. Because decade counter 652 is a divide-by-10 counter arranged as a divide-by-7 counter, the horizontal. sync presents counter 652 at count 3 to count from 4 through 10 for a total of seven counts. However, if a conventional divide-by-7 counter were utilized, if desired, instead of a modified divide-by-10 counter, then this counter would be preset to 0. The conventional modification to decade counter 652 to provide a divide-by-7 counter therefrom is provided by a NOR gate 658 connected to the load input of counter 652. Counter 652 is preferably chosen as a divide-by-7 counter so that its cycle corresponds to one character, the binary output of counter 652 representing the bit number within a character, which preferably comprises seven bits, by counting the clock B' input to counter 652. At the completion of the seventh count, counter 652 preferably generates a pulse which is used to enable counter 654 which only counts a clock B' pulse when enabled by counter 652. Therefore, counter 654 only counts characters, one enabling pulse being provided per seven bit character from counter 652. The output of counter 654 preferably enables counter 656 which functions together with counter 654 as a two digit character counter 660, each of counters 654 and 656 preferably having a four wire BCD output. It should be noted that, preferably, counter 654 contains the least significant digit and counter 656 contains the most significant digit of the two digits. These BCD outputs are preferably connected to conventional BCD-to-decimal decoders 662 and 666, respectively, such as integrated circuit BCD-to-decimal decoders of the type manufactured by Texas Instruments under designation SN7442AN. It should be noted that decoder 664 is preferably for the 10 position and decoder 662 is preferably for the ones position so that, by way of example, if the two digit output is the character 38 indicating character position 38, then it would be a 3 output from decoder 664 and an 8 output from decoder 662. Accordingly, decoders 662 and 664 preferably provide a decimal output of the character position while counter 652 provides the binary output of the bit position within a character.

The various gating and flip-flops illustrated in FIG. 8 which are conventionally associated with the outputs of decoders 662 and 664 and counter 652 conventionally provide the output signals representative of character position and bit position within a character in accordance with the desired bit and character output timing signals from counter 652 and decoders 662 and 664 required for the balance of the circuitry. As will be described in greater detail hereinafter, by way of example, the critical timing signals shall be chosen as those for character positions 38, 39, 40, 41, bit 7 of character 40, character positions 1,2,3,4,5 and 6, the first bit of the 7 bit count of counter 652 and the last 2 bits of this 7 bit count. Before describing the generation of these character position timing signals, it should be understood that the gating scheme illustrated in the figures and particularly in FIG. 8, is merely illustrative, by way of example, of a typical bit assignment of a pseudo video scan line 12 which could be varied to any desirable bit assignment with appropriate conventional modification to the circuitry so as to select a different set of appropriate timing signals. The 38th character position timing signal is present on path 670 and is provided when decoder 664 provides a 3 to negative NAND gate 672. The 39th character position timing signal is present on path 676 and is provided when a 3 is provided from decoder 664 via path 674 to negative NAND gate 678 and a 9 is provided from decoder 662 to gate 678. The 40th character position timing signal is provided on path 680 from negative NAND gate 682 when a 4 is provided from decoder 664 via path 684 and a 0 is provided from decoder 662 to gate 682. The 41st character position timing signal is provided on path 686 from negative NAND gate 688 when a 4 is provided from decoder 664 on path 684 to 688 and a 1 is provided from decoder 662 to gate 688.

A conventional four input NAND gate 690 has one input connected to path 680 from gate 682 which provides an output during the occurrence of the 40th character position for the pseudo video scan line 12, and the other three inputs thereto connected to the outputs of bit counter 652. NAND gate 690 preferably provides an output on path 692 when the binary number 7 is present on the three output lines of counter 652 and the 40th character position timing signal is present on path 680 from gate 682 which is only present for the seventh bit of the 40th character. This output is inverted through conventional inverter 694 and provided to a conventional flip-flop 696 whose output in the set state is the data gate signal present on path 698. The two least significant bit outputs of counter 652 are preferably connected in parallel to another conventional NAND gate 700 whose output on path 702 is preferably only low when the first bit of the 7 bit count is present, this output being provided as one input to negative NOR gate 704 whose other input is connected through an inverter 706 to the most significant bit output of counter 652, which input is present only for the last two bits of the 7 bit count of counter 652. The output of gate 704 is termed the "load memory" signal which is provided via path 708. In addition, the most significant bit output of counter 652 is connected in parallel via path 710 to provide what is termed the "change memory address" signal on path 710 which is present for the last two bits of the 7 bit count of counter 652. As was previously mentioned, the data gate output signal provided via path 698 from flip-flop 696 is set by the 4th character position timing signal provided as the output of negative NAND gate 712 whose inputs are the digit 0 from decoder 664 and the digit 4 from decoder 662. Flip-flop 696 is preferably reset by the seventh bit of the 40th character which is the signal provided via path 692, shown as inverted, by way of example, for the logic chosen by way of example. This data gate output is provided on path 698 when flip-flop 696 is in the set state. In addition to providing the set state for flip-flop 696, the output of negative NAND gate 712 which is the character 4 position timing signal, is provided in parallel via path 714 to provide the row gate signal and as one input to a two input NOR gate 716 whose output via path 718 is the video gate signal provided during the 1,2,3 and 4 characters of the pseudo video scan line 12, the other inputs to NOR gate 716 being the character 1, 2 and 3 position timing signals provided from negative NOR gate 720 through a two input NAND gate 722 whose other input is the 0 output of decoder 664, with the inputs to gate 720 being the digit 1,2 and 3 decoded outputs of decoder 662.

The page address clock output on path 512 is preferably present for character positions 1, 2 and 3 and is gated on during these character times, this output signal being provided from a NAND gate 724 which has one input connected in parallel via path 726 to the output of NAND gate 722 which is the present during character positions 1,2 and 3, the other input connected via path 728 to the output of a conventional single-shot 730. Single-shot 730 is preferably fired by the leading edge of the clock B' input pulse to insure symmetry in the clock pulse, the pulse duration of single-shot 730 preferably being set at one-half the clock B' pulse period to insure this symmetry so that single-shot 730 actually reproduces the clock B pulse. Thus, the clock B pulse is, in reality, the clock B' pulse reconstituted by single-shot 730 in conventional fashion.

Decoder 412 also provides a latch gate output signal via path 732 as the output of a two input NAND gate 734 whose inputs are the clock B' pulse and the carry output of the divide-by-seven counter 652 so that the latch gate output signal on path 732 is the clock B' output as gated by the completion of the most significant bit count, which is the seventh bit count, of counter 652. Decoder 412 also preferably provides a memory gate output signal on path 740 from another conventional flip-flop 742 which is preferably set by the character 6 position timing signal via path 744 and reset by the character 39 position timing signal via path 746. Flip-flop 742 provides the memory gate output signal on path 740 in the set state. The character 6 position timing signal via path 744 is provided at the output of a negative NAND gate 750 whose two inputs are the digit 0 of decoder 664 and the digit 6 of decoder 662 with the character 39 position timing signal provided via path 746 to flip-flop 742 being the signal provided via path 676 but inverted by inverter 752.

Now referring to FIG. 8 and describing the presently preferred error check circuit 432. Error check circuit 432 preferably comprises a conventional JK flip-flop 760 which receives the clock B input from single-shot 730 via path 762 and also receives the data input from input data line 408. The output of flip-flop 760 will preferably follow the input data line except that it will be synced with the clock B signal by the clocking of flip-flop 760. The output of the flip-flop 760 is provided as one input to a two input NAND gate 766 whose other input is the clock B input provided in parallel via path 762. Thus, NAND gate 766 has one clock pulse output for each 1 bit on the data line 408, the presently preferred method of error checking being to count the 1 bits present on the data line 408. In order to accomplish this counting, error check circuit 432 preferably includes two four bit cascaded conventional binary counters 770 and 772, such as the IC type manufactured by Texas Instruments under designation SN74161N which count these 1's to preferably provide a maximum count of 256 bits. Counters 770 and 772 are preferably initially reset by the horizontal snyc signal and are enabled to count preferably through character position 37. The counting of counter 770 and 772 is preferably inhibited for characters 38 and 39, this inhibiting signal being provided via path 780 from the output of a conventional two input NOR gate 782, with one input being provided thereto via path 676 for the character 39 position and the other input being provided thereto via path 670 for the character 38 position. In the example given, the character 38 position for the pseudo video scan line 12 is preferably the error check position of region E. Therefore, during the occurrence of character positions 38 and 39, a parallel binary output is provided from counters 770 and 772 which represents the total number of 1 bits counted up through the character 37 position, this output being present or continually provided as one input to a conventional exclusive or comparator 784 and 786, respectively, such as the IC type manufactured by Texas Instruments under designation SN7468N. The data line input provided via path 408 is preferably provided in parallel as an input to a conventional shift register 790, such as a Texas Instrument SN74164N type, which is clocked by the clock B pulse as gated on by the character 38 position timing signal so that shift register 790 is preferably only clocked during the occurrence of the 38th character position. Therefore, at the completion of the 38th character, the check sum contained therein is provided as a parallel binary output to comparators 784 and 786, respectively. As presently preferred, the check sum is the complement of the number of 1 bits contained in the pseudo video scan line 12. If every bit of the check sum provided to comparator 784–786 from shift register 790 is the complement of the bit count provided to comparator 784–786 from counters 770 and 772, respectively, then each output line of comparators 784 and 786 will preferably be high. If all these lines are high, this indicates that the error check is OK. A NAND gate 794 is connected to the parallel bit output of comparator 784 and another NAND gate 796 is preferably connected to the parallel bit output of comparator 786. The output of NAND gates 794 are 796 are preferably connected to the inputs of a two input negative NAND gate 798 whose output is the error check OK signal provided via path 800 to one input of a two input NAND gate 802. Gates 794, 796 and 798 conventionally provide logical anding of the comparator 784–786 outputs, gate 798 preferably only having an output when each output of comparator 784 and 786 is high. Therefore, the output of gate 798 is an error check OK signal on path 800 at the completion of the 38th character, which is during the occurrence of the 39th character. NAND gate 802 preferably samples path 800 during the 39th character so that if there is an error check OK signal present on path 800 during this time, the other input to NAND gate 802 being the 39th character position timing signal via path 676, then NAND gate 802 will provide a negative pulse error check OK signal on path 804 to a conventional flip-flop 806 which gets set by the presence of the negative pulse via path 804 corresponding to the error check OK signal and provides an output signal which is the error check OK signal provided via path 436. Flip-flop 806 preferably holds this state unitl the start of the 38th character of the next pseudo video scan line 12 which is indicated by the presence of a signal on path 808 from shift register 790. This signal resets flip-flop 806 and the cycle previously described repeats when the 39th character comes up in the next pseudo video scan line 12 if a valid error check is present.

Now the selectable divide-by-8 or divide-by-1 frequency divider 428 (FIG. 6) shall be described in greater detail with reference to FIG. 8. The frequency divider 428 preferably comprises a conventional divide-by-8 counter 810, such as a Texas Instruments SN74161N. This counter 810 receives the clock A master clock frequency via path 426 from the voltage controlled oscillator portion of chip 650 and generates a clock A-divided-by-8 signal via path 812 as one input to a two input NAND gate 814. The other input to NAND gate 814 is the permission write signal provided via path 550b. Another conventional two input NAND gate 816 receives as one input the clock A master frequency input in parallel via path 426 and as the other input the inverted permission write signal input provided via path 550b as inverted by invertor 818. NAND gate 816 preferably provides the clock A output to a two input negative [orgate] *OR gate* 820 when the permission write signal is not present on path 550b and NAND gate 814 preferably provides the clock A divided-by-8 output to negative [or] *OR* gate 820 when the permission write signal is present on path 550b. Negative [orgate] *OR gate* 820 provides a clock output termed clock B' on path 822 which is equivalent to whichever output is being provided to negative [orgate] *OR gate* 820 dependent on the permission write signal condition provided via path 550b.

KEYBOARD CIRCUIT

Figure 9:
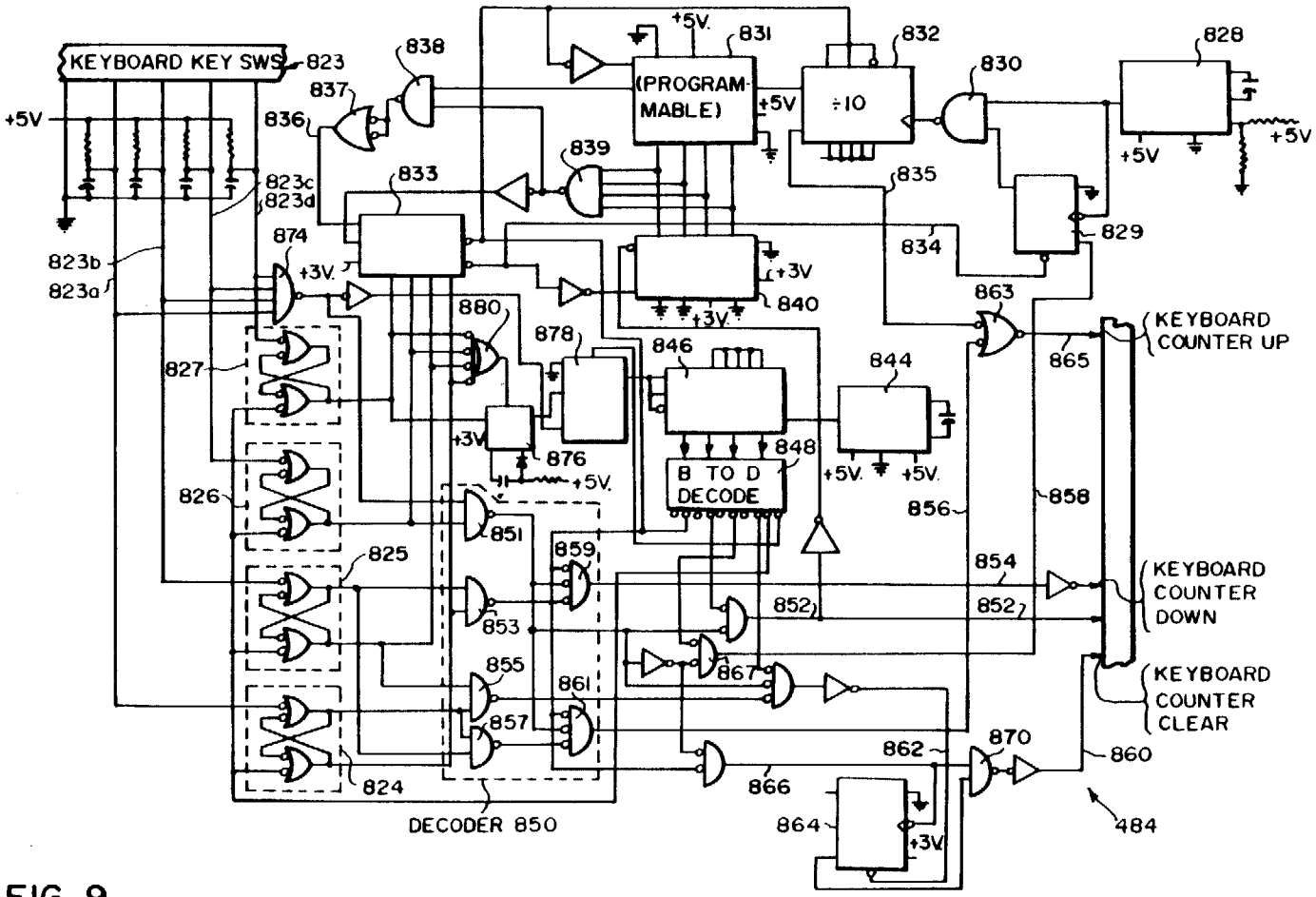
FIG. 9 is a logic diagram, partially in schematic, of the keyboard portion of the timing and keyboard control portion of the receiver illustrated in FIG. 3.

Referring now to FIG. 9, the keyboard circuit generally referred to by the reference numeral 484 in FIG. 3, shall be described in greater detail. As previously mentioned, keyboard circuit 484 is preferably a conventional 10 digit keyboard which provides a serial digital output, the outputs preferably being group call via path 486, number via path 488, up or more via path 490, down or back via path 492 and page call via path 494, all of these outputs being provided to keyboard counter 500 (FIG. 5). Although the keyboard circuitry 484 illustrated in greater detail in FIG. 9 is conventional, it shall be described in greater detail for purposes of clarity. The keyboard circuit 484 preferably comprises a four line key input 823 which is a parallel BCD (binary coded decimal) input. Each of the input lines 823a, 823b, 823c and 823d preferably feeds a set/reset latch 824, 825, 826 and 827, respectively, which are conventional, so that when a key is depressed, the appropriate latch 824 through 827 is set and stays set until released. The purpose of the keyboard circuit 484 is to make a BCD-to-binary conversion, the output of the keyboard circuit 484, as previously mentioned, being a serial signal comprising the number of pulses equivalent to the number depressed at the key input 823. A conventional oscillator, such as, by way of example, a 5 megahertz oscillator generates a master signal in parallel to the clock input of a conventional JK flip-flop 829 and to one input of a two input NAND gate 830. Flip-flop 829 and NAND gate 830, as will be described in greater detail hereinafter, preferably comprise a switch for turning the output of oscillator 828 to the balance of the circuit on and off, oscillator 828, however, being a continuously running oscillator. Flip-flop 829 and NAND gate 830 insure that the output line does not start with a partial cycle. A pair of counters 831 and 832 comprise a programmable decade counter which together provide a divide-by-10 to divide-by-one million counter. Programmable counter 831 is preferably a conventional programmable counter of the type manufactured by Mostec under the designation MK5009P, with counter 832 being a conventional divide-by-10 decade counter of the type manufactured by Texas Instruments under designation SN74160N. The output frequency of the programmable decade counter 831–832 is preferably applied to a conventional key counter 833 such as the type manufactured by Texas Instruments under designation SN74193, which is preferably preloaded to a number equal to the keyboard input value from latches 824, 825, 826 and 827. The counter 833 preferably only contains one digit at a time and is preferably preloaded with the most significant digit first. Key counter 833 then preferably counts down to 0 at the input frequency supplied from programmable decade counter 831–832 and provides a signal to flip-flop 829 via path 834 to reset flip-flop 829 to its off state so that, therefore, no output will be provided from flip-flop 829 to NAND gate 830 and, accordingly, gate 830 will not provide the master clock output from oscillator 828 to counter 832, thus effectively shutting off the input frequency. As a result, the total number of pulses supplied to the keyboard counter 833 input during the count cycle is equal to the keyboard input digit. In the row grabbing system 10 being presently described by way of example, five digits are preferably chosen as being descriptive of the group and page, with the first two digits comprising the group and the last three digits comprising the page so that the keyboard number input through the keyboard 484 to the system 10 is a five digit number containing this information. Accordingly, the first digit depressed is the most significant digit and, for example, if it is a one, it is equal to 10,000 pulses. In this instance, programmable decade counter 831–832 would be a divide-by-10,000 counter so that the output signal present on path 835 from the carry output of decade counter 832 would be equal to 10,000 times the input signal on path 836 to key counter 833, the signal on 836 being the output of negative OR gate 837, whose input is in turn connected to the output of NAND gate 838, whose inputs are in turn connected to the output of NAND gate 839 and programmable counter 831. This cycle repeats for each digit for a total of five cycles, in the example given, with programmable decade counter 831–832 being programmed to divide by one less decade for each successive digit; for example, in the example given, to divide-by-10,000 for the most significant digit, then to divide-by-1,000 for the next digit, then to divide-by-100 for the next digit, then to divide-by-10 for the next digit, and finally to divide-by-1 for the least significant digit. The inputs to programmable counter 831 are preferably connected to the output of a conventional digit counter 840, such as the type manufactured by Texas Instruments under designation SN74193N, whose output programs programmable counter 831. Digit counter 840 is preferably initially set *to* 4 which programs counter 831 to divide-by-10,000. Every time a cycle is completed on key counter 833, its output causes digit counter 840 to coun down one digit to reprogram programmable counter 831. For example, in the example given, at the end of the most significant digit, digit counter 840 would count down one digit to 3 from 4, resetting programmable counter 831 to divide-by-1,000, and so forth as the cycle repeats with each successive digit. In other words, the binary output of digit counter 840 becomes the exponent of the programmable decade counter 831.

PROGRAM COUNTER CONTROL

A conventional oscillator 844, such as 50 hertz in the example given, preferably provides the clock signal to a program counter 846, such as a conventional Texas Instrument model no. SN74160N, which establishes the program steps. The binary output of program counter 846 is preferably converted to decimal by conventional binary-to-decimal decoder 848, such as a conventional Texas Instrument SN7442AN. Each output line of decoder 848 preferably corresponds to one of the steps of a preferably ten step key examination program. The keyboard preferably consists of digits 0 to 9 and three special keys labeled up, down and call. The key input 823 preferably provides 16 binary values only 10 of which are used for digits 0 through 9, three of the remaining six values preferably being utilized for the special keys. The conventional decode network comprising NAND gates 851, 853, 855, and 857 and negative NAND gates 859 and 861, decodes the input signal to determine if the key depressed is an up, down, call, or a number (one of the digits 0 through 9). If an up, down, or call key is depressed, a pulse will be present on path 852 in the logic arrangement selected by way of example. This pulse present on path 852 will preload digit counter 840 with the number 4 and will provide a keyboard register enable signal which, as will be described in greater detail hereinafter, will cause the keyboard register 910, 912, 914 (FIG. 10) to accept the number previously generated. It should be noted, that in the system illustrated by way of example, digit counter 840 must preferably be preset when the system 10 is turned on by depressing the call key initially; thereafter, the call key is depressed after the requested five digit number has been inputed. The initial depression of the call key in this instance, as previously mentioned, establishes the required initial conditions for the system 10 by preloading digit counter 840 with the number 4 so 'hat programmable counter 831 is initially programmed to divide-by-10,000. If the down key is depressed, in addition, a pulse will be present on path 854 for the logic chosen, to decrement the keyboard counter 500 (FIG. 10) by 1. Similarly, if the up key is depressed subsequent addition to the call key, a pulse will be present on path 856, which is provided as one input to a two input NOR gate 863 to provide an output pulse on path 865 to increment the keyboard counter 500 (FIG. 10) by 1. If a number is depressed, a pulse is present on path 858 from the output of negative NAND gate 867 which pulse is provided to flip-flop 829 to turn on flip-flop 829 to initiate the pulse counting cycle previously described by providing an output pulse to NAND gate 830 to permit the pulse output of oscillator 828 to be passed to the clock input of decade counter 832 which together with programmable counter 831, key counter 833 and digital counter 840, as previously mentioned, accomplishes the pulse counting cycle. A keyboard counter clear pulse is provided via path 860 to the keyboard counter 500 (FIG. 10) when a number is depressed after a non-number condition. This is accomplished in the following manner. A preset pulse is provided to a conventional JK flip-flop 864 via path 862 when a call key, an up key, or a down key is depressed, this condition being decoded by decoder 850. A pulse is present on path 866 when a number is depressed, this condition also being decoded by decoder 850. Flip-flop 864 enables a NAND gate 870 when it is preset so that the pulse present on path 866 when a number is depressed will be passed through NAND gate 870 to provide the keyboard counter clear pulse on path 860. The trailing edge of the pulse present on path 866 clears flip-flop 864 so that subsequent number pulses provided via path 866 will not issue a keyboard counter clear pulse on path 860 unless flip-flop 864 is again preset by first receiving a pulse on path 862.

The keyboard input circuitry also preferably includes conventional bounce rejection circuitry in initiating the program step operation of key processing. A four input NAND gate 874 is connected to input lines 823a, 823b, 823c, and 823d and provides an output when all the key input lines are high which preferably indicates that no key has been depressed. When any key is depressed, the output of gate 874 preferably goes low. When the depressed key has been released, the output of gate 874 returns to high which triggers conventional single-shot 876 to fire. At the end of the single-shot pulse, which is preferably chosen to be long enough to allow bounce rejection and short enough to allow an acceptable key depression interval, such as approximately 50 milliseconds, a JK flip-flop 878 is set which then enables program counter 846 which, as previously mentioned, starts the ten step key processing program operation. Flip-flop 878 is then preferably automatically reset by the last step of the program as indicated by a signal provided from decoder 848 to the preset input of flip-flop 878. A negative NOR gate 880 is connected in parallel to the output of key counter 833 and inhibits the triggering of single-shot 876 if any key is depressed.

Figure 10:
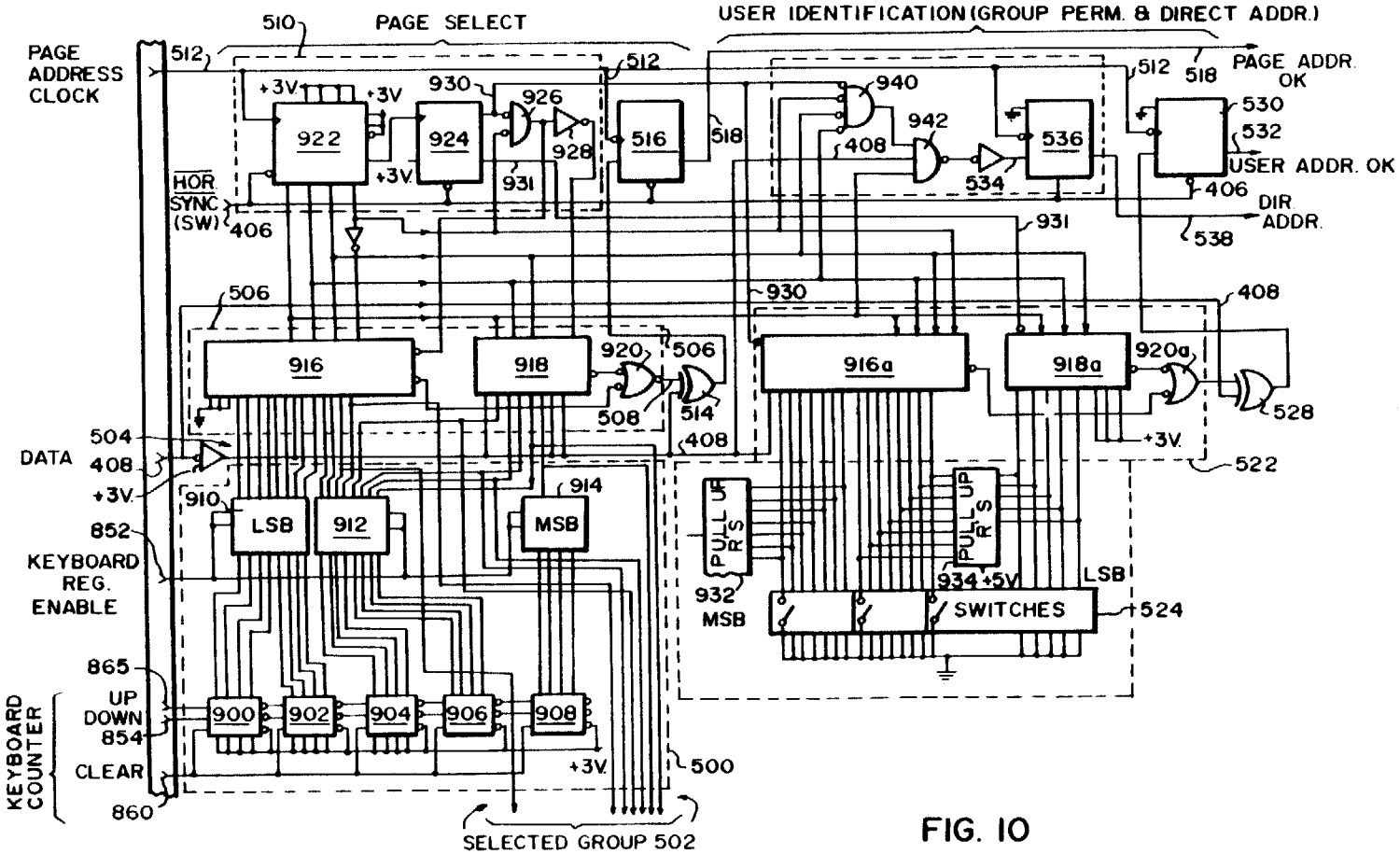
FIG. 10 is a logic diagram, partially in schematic, of the portion of the memory input control portion of the receiver illustrated in FIG. 5.

Referring now to FIG. 10, a portion of the memory input control system illustrated in the block diagram of FIG. 5 and generally described with reference thereto shall be described in greater detail hereinafter. The keyboard counter 500 as shown and preferred in FIG. 10 consists of five conventional cascaded four bit up/-down counters 900, 902, 904, 906 and 908 which provide a 20 bit binary output in toto. Selected outputs from the counters 900 through 908, inclusive, are provided to conventional latches 910, 912 and 914, latches 910 and 912 being, by way of example, the type manufactured by Texas Instruments under the designation SN74100N and latch 914, by way of example, [if] *is* of the type manufactured by Texas Instruments under designation SN7475N. The output of counters 900, 902, 904, 906 and 908 is the binary equivalent of the entire keyboard input number with the least significant bit preferably being contained in counter 900 and the most significant bit preferably being contained in counter 908. Counter 900 and 902 provide the least significant bits to latch 910, counters 904 and 906 provide the next *significant* bits to latch 912 and counter 908 provides the most significant bits to latch 914, latches 910, 912 and 914 comprising the keyboard register which is enabled by a signal present on path 852, which is provided as previously described. Similarly, the up, down and clear signals for counter stages 900 through 908, inclusive, are provided via path 865, 854 and 860, respectively, in the manner previously described with reference to FIG. 9. Counter stages 900 through 908 are preferably, by way of example, of the type manufactured by Texas Instruments under designation SN74193. It should be noted that in the example given although a 20 bit binary output is provided by counter stages 900 through 908, inclusive, only 17 bits are preferably actually utilized to provide the keyboard input number. Latches 910, 912 and 914 are loaded and store this keyboard number upon receipt of the keyboard register enable signal via path 852.

As was previously mentioned with respect to FIG. 5, the selected page output of latches 910, 912 and 914 associated with keyboard counter 500 is provided to multiplexer 506 which, as shown and preferred in FIG. 10, comprises a two stage integrated circuit multiplexer 916–918. In the example given, the multiplexer 506 comprises two stages 916 and [198] *918* because the practical limits of available integrated circuit multiplexes are 16 bits per package or chip. Accordingly, if a 17 bit multiplexer is available one could be utilized instead of the two stages 916 and 918. Stage 916, by way of example, is preferably of the type manufactured by Texas Instruments under designation SN74150N and stage [916] *918* is, by way of example, of the type manufactured by Texas Instruments under designation SN74151AN. As was previously described with reference to FIG. 5, nultiplexer 506 provides a serial output of the selected page address via path 508 by combining the outputs of stages 916 and 918 in conventional fashion through negative NOR gate 920 which provides one input via path 508 to exclusive or gate 514, the other input to gate 514 being provided via the data line 408. As also shown and preferred in FIG. 10, flip-flop 516 is a conventional JK flip-flop such as the type manufactured by Texas Instruments under the designation SN74S113N.

As was previously mentioned, with respect to FIG. 5, the other input to multiplexer 506 is provided from the page address counter 510 which preferably provides five bits for the page address, by way of example. Counter 510 is a two-stage counter comprising stages 922 and 924, once again, for the reason that the practical limit of such integrated circuit chips is four bits in one package or chip. Accordingly, if a five bit counter can be obtained it can readily replace the two stages 922 and 924. Thus, stage 922 is a four bit counter, such as the type manufactured by Texas Instruments under designation SN74161N, by way of example, and stage 924 is a conventional flip-flop such as the type manufactured by Texas Instruments under the designation SN7474N, flip-flop 924 adding one more bit to the four bit count of counter 922. As was previously mentioned, counter stages 922 and 924 advance the multiplexer 506, which is accomplished in the following fashion. The output of stages 922 and 924 of counter 510 is provided to the inputs of a two input conventional negative NAND gate 926, the output of stage 924 being provided to one input and the output of stage 922 being provided to the other input. Gate 926 preferably functions as a simple decoder which turns the appropriate multiplexer stage 916 or 918 off while the other one is on. Counter stages 922 and 924 are cleared by the horizontal sync signal provided via path 406. In the arrangement illustrated in FIG. 10, multiplexer stage 918 is first utilized and then multiplexer stage 916 is utilized, stage 918 being selected and stage 916 being off as long as the output of decoder 926 is low and the output of an inverter 928 connected thereto is high, the output of inverter 928 being provided to stage 918 and the output of decoder 926 being provided directly to stage 916. When the count of stage 922 and 924 of counter 510 reaches 8, then the output of decoder 926 preferably goes high and the output of inverter 928 preferably goes low which turns the stage 918 off and selects stage 916. As was previously mentioned, the output of page address counter 510 is also preferably provided to another conventional multiplexer 522, one input to multiplexer 522 being the hard-wired connection of the user address 524 illustratively represented by the switches and associated pull-up resistor banks 932 and 934, which are conventional, to provide a high in the off condition and to provide a low when a particular connection is hard-wired. Multiplexer 522 is preferably identical in construction and operation to multiplexer 506 and, similarly, comprises stages 916a and 918a which are identical in structure and operation with stages 916 and 918 of multiplexer 506 with the exception that multiplexer stage 916a or 918a is selected by the last stage 924 of the page address counter 510 without decoding via path 930 or 931, with stage 916a being on for the first 16 counts then stage 918a being on for the remaining five counts, 21 bits being preferably assigned to the overall function. Thus, the page address counter 510 outputs are provided in parallel to stages 916 and 918 of multiplexer 506 and to stages 916a and 918a of multiplexer 522.

As was also previously mentioned with respect to FIG. 5, the selected group address 502 is provided in parallel from appropriate stages of latches 910, 912 and 914 of the keyboard counter 500.

Thus, it has been described how the page address signal is provided via path 518 and the user address OK signal is provided via path 532 from flip-flop 530 which, as shown and preferred, is another conventional JK flip-flop, such as the type manufactured by Texas Instruments under the designation SN74S113N. As was previously mentioned with reference to FIG. 5, the direct address OK signal provided via path 538 is provided to another flip-flop 536, such as another conventional JK flip-flop of the type similar to flip-flop 530. As was previously mentioned with respect to FIG. 5, a bit one gate signal is provided via path 534 from decoder stage 940–942 which comprises negative NAND gate 940 and NAND gate 942 which decodes the page address counter 510 outputs to give a 1 on path 534 at the K input to JK flip-flop 536 during the first bit or count of the page address clock provided via path 512 if a 1 exists on the data line 408 at that time, the data line 408 being provided one input to gate 942 of decoder 940–942. As was previously mentioned, it should be noted that the first two digits of the five digit keyboard input number is preferably the selected group 502 and the last three digits are the selected page 504, with a total of seven bits preferably being provided for the group and 10 bits for the page information for a total of 17 bits for the five digit keyboard input number.

Figure 11:
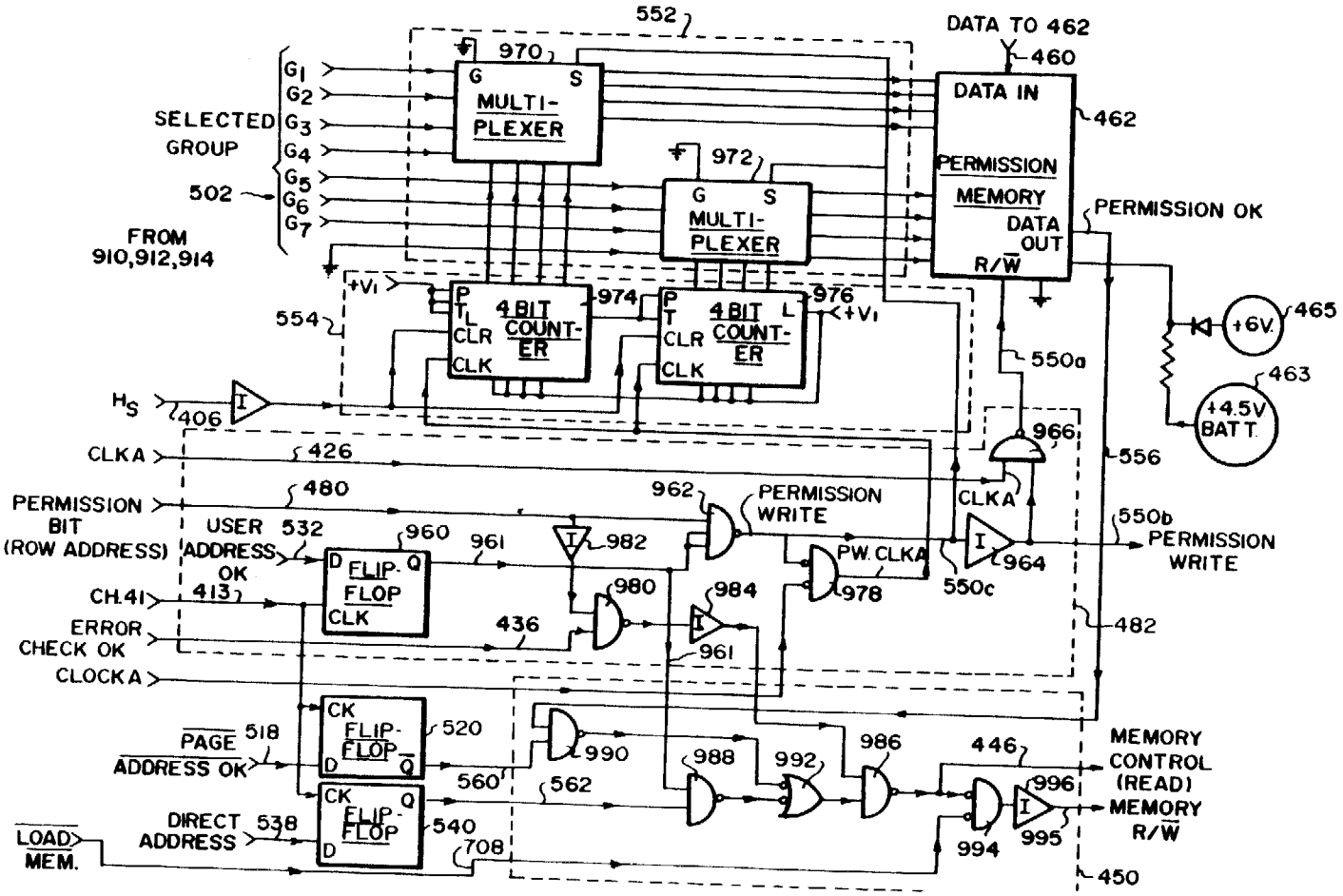
FIG. 11 is a logic diagram, partially in schematic, of the portion of the memory input control portion of the receiver illustrated in FIG. 6.

Referring now to FIG. 11 which is a detailed logic schematic of the balance of the memory input control system which has been previously generally described with reference to FIG. 6, and referring initially to permission write logic 482, this logic 482 preferably comprises a conventional flip-flop 960 which provides a one television scan line delay (approximately 63 microseconds) of the user address OK signal provided via path 532 to the flip-flop 960. The output of flip-flop 960 is preferably provided via path 961 to one input of a NAND gate 962 whose other input is the permission bit line 480, NAND 962 preferably providing a low output when both the permission bit line 480 is high and the output of flip-flop 960 is high. As shown and preferred for the logic chosen, the output of gate 962, which is the permission write signal, is inverted by an inverted 964 to provide a high signal on the permission write line 550b during the permission write mode. This high output signal level is also provided in parallel to one input of a two input NAND gate 966 whose other input is the master clock A signal provided via path 426 to provide a write clock or command signal via path 550a to the permission memory 462. Permission memory 464 is preferably a conventional integrated circuit, such as the type manufactured by Signetics under the designation 2602B. Multiplexer 552 which selectively provides the selected group input 502 to the permission memory 464 preferably comprises two integrated circuit stages 970 and 972 such as, by way of example, the type manufactured by Texas Instruments under the designation SN74157N. The bit counter 554 which provides another selectable input to multiplexer stages 970 and 972 of multiplexer 552 preferably comprises two conventional four bit counters 974 and 976, such as the type manufactured by Texas Instruments under the designation SN74161N, which are clocked by the clock A signal and switched on by a negative NAND 978 contained in the permission write logic 482. During the permission write mode, the inputs to gate 978 are the permission write signal output of gate 962 and the clock A signal. Permission memory 462 is preferably a static MOS memory, such as one having a 1024 bit capacity arranged in a one-bit-by-1024 bit array. Permission memory 462 preferably holds its content even when the system 10 has been turned off as a result of a low potential battery signal, such as one provided from a plus 4.5 volt battery 463 when the system is turned off. When the system is on, power is preferably applied to memory 462, from a conventional plus 6 volt source 465 which charges the plus 4.5 volt battery 463 and supplies power to permission memory 462.

Now describing the memory write logic 450, the permission bit present on path 480 is preferably inverted by an inverter 982, for the logic chosen by way of example, and provided as one input to a two input NAND gate 980 whose other input is the error check OK signal provided via path 436. The output of gate 980 is preferably low when the error check OK signal is present on path 436 and permission is not set. The output of gate 980 is inverted for the logic chosen by way of example by inverter 984 to provide one input to another two input NAND gate 986 contained within the memory write logic 450. Memory write logic 450 also preferably comprises another two input NAND gate 988 which receives as its inputs the delayed direct address OK signal present on path 562 and as the other input thereto the delayed user address OK signal provided via path 961, and provides a low output if the user address is OK as indicated by the signal on path 961 and the direct address bit was set as indicated by the signal on path 562. Memory write logic 450 also preferably includes another two input NAND gate 990 which receives as one input the delayed page address OK signal provided via path 560 and as the other input thereto the permission OK signal provided via path 556 from permission memory 462 and provides a low level output when both these inputs are asserted. The output of gate 988 is provided as one input to a conventional two input negative NOR gate 992 and the output of gate 990 is provided as the other input to gate 992 which preferably has a high output when either the user address is OK and the direct address bit is set or when the page address is OK and permission is OK. The output of gate 992 is provided as one input to NAND gate 986 whose other input, as previously described, is provided from the inverted output of gate 980. The output of gate 986 is, accordingly, preferably high when an output is received from both gates 992 and 980, via inverter 984. The output of gate 986, which is the memory control read signal provided via path 446, is preferably high during the memory read mode and low during the memory write mode for the main memory 464. Memory logic 450 also preferably includes a negative NAND gate 994 which receives as one input the output, in parallel, of gate 986 and as the other input the load memory clock provided via path 708 so that this clock signal provided via path 708 is present at the output of gate 994 during the memory write mode for the main memory 464 and is inverted, preferably, by inverter 996 and provided via path 995 to main memory 464 to clock the memory 464.

Figure 12:
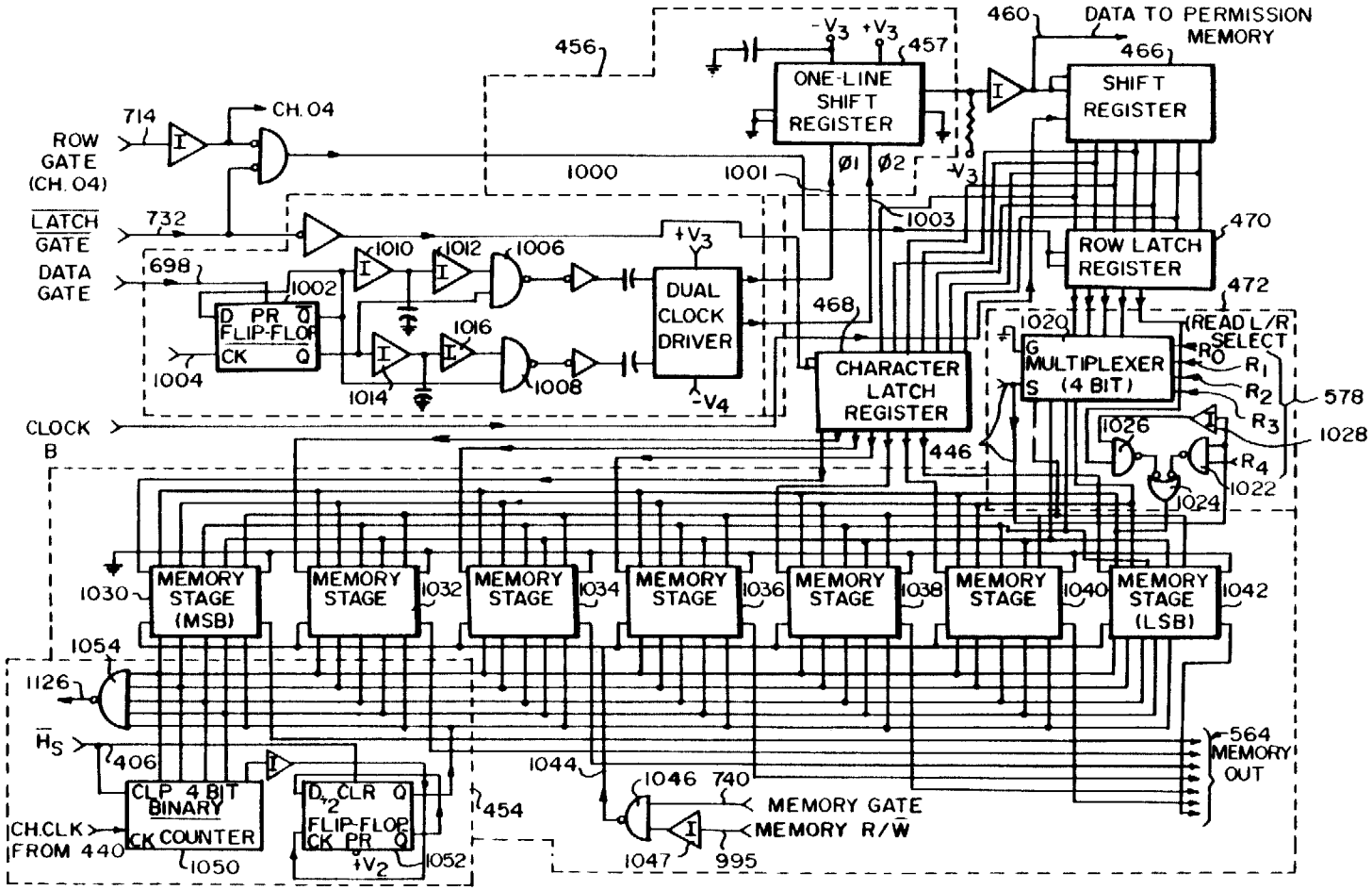
FIG. 12 is a logic diagram, partially in schematic, of the memory and output processing portion of the receiver illustrated in FIG. 3.

Referring now to FIG. 12, the memory and output processing portion of the receiver portion 28 of the row [grabbling] *grabbing* system 10 of the present invention shall be described, this portion having previously been generally described with reference to FIGS. 3 and 6. The serial memory 456 preferably comprises the conventional one line shift register 457, such as the type manufactured by Signetics under the designation 2502B, which is preferably driven by a two phase clock 1,000, the phase 1 output clock to shift register 457 being indicated by reference numeral 1,001 and the phase 2 output clock to shift register 457 being indicated by output line 1,003. Two phase clock generator 1,000, which is preferably conventional, comprises a conventional divide-by-2 flip-flop 1,002 whose clock input is the delayed clock A signal present on path 1,004, the clock A signal on path 1,004 being preferably delayed a fraction of a clock period. Flip-flop 1,002 preferably serves alternately to enable either a two input NAND gate 1,006 or another two input NAND gate 1,008, the other input to gate 1,006 being a delayed output of the inverted flip-flop 1,002 output. As a result, the output of gate 1,006 is preferably low only during the delay interval of the delay network comprising inverters 1,010 and 1,012. Thus, the output of gate 1,006 is a narrow negative going pulse which occurs every other clock cycle. Similarly, the output of gate 1,008, whose other input is provided via another delay network comprising inverters 1,014 and 1,016, provides a similar narrow negative going pulse, but which is staggered with the pulse train from gate 1,006. The outputs of gates 1,006 and 1,008 are provided to a conventional dual clock driver 1,018, such as the type manufactured by National Semiconductor under the designation MH0026CN, which amplifies the two clocks and supplies them to shift register 457 via path 1,001 and 1,003 at a higher voltage level with a relatively high current drive capability, shift register 457 being strobed by conventional two phase clock 1,000.

Multiplexer 472, which selects the row address from the row latch 470 in the main memory write mode and from the row address counter 474 in the memory read mode, preferably comprises a conventional four bit multiplexer 1020, such as the type manufactured by Texas Instruments under the designation SN74157 and a conventional one bit multiplexer made up of NAND gates 1022 and 1026, negative NOR gate 1024 and inverter 1028 connected in conventional fashion to function as a one bit multiplexer which together with multiplexer stage 1020 function as a five bit multiplexer 472.

The main memory 464, which is preferably conventional, preferably comprises seven stages 1030, 1032, 1034, 1036, 1038, 1040 and 1042, with each stage preferably being a 1024-by-1 bit array, such as the type manufactured by Signetics under the designation 2602B, with the most significant bit preferably being contained in stage 1030 and the least significant bit preferably being contained in stage 1042. As shown and preferred, there is a different input line for each stage 1030 through 1042, inclusive, with the input lines being provided from the character latch 468, which is preferably a conventional character latch such as the type manufactured by Texas Instruments under designation SN74100N, a different input line from character latch 468 being provided for each stage 1030 through 1042, inclusive, for a total of seven parallel outputs from character latch 468. Each stage 1030 through 1042, inclusive, preferably stores one specific bit of every character with stage 1042, as was previously mentioned, storing the least significant bit of every character and stage 1030 preferably storing the most significant bit of every character. The main memory 464 portion also preferably includes a conventional two input NAND gate 1046 which turns on the memory write pulses present on path 995, provided thereto through inverter 1047 for the logic chosen, during the precise period corresponding to the 32 characters of data the other input gate 1046 being the memory gate signal provided via path 740. This modifified signal is provided via path 1044 to all stages 1030 through 1042, inclusive, of main memory 464. As shown and preferred in FIG. 12, the five row address line parallel output of multiplexer 472 is preferably connected in parallel to all stages 1030 through 1042, inclusive, of main memory 464. Similarly, five character address lines from character address counter 454 are preferably connected in parallel to all stages 1030 through 1042, inclusive, of main memory 464. The character address counter 454, which provides the character address to main memory 464, preferably comprises a four bit conventional binary counter 1050, such as the type manufactured by Texas Instruments under the designation SN74161N, and a conventional divide-by-two flip-flop 1052, such as the type manufactured by Texas Instruments under designation SN7474N, for the fifth bit to provide a five bit character address counter 454. If desired, of course, a single five bit counter could be utilized. The character address counter for character counter 454 also preferably includes a conventional decoder gate 1054 which preferably provides a low level output on path 1126 during the occurrence of the character time corresponding to character 32.

Figure 13:
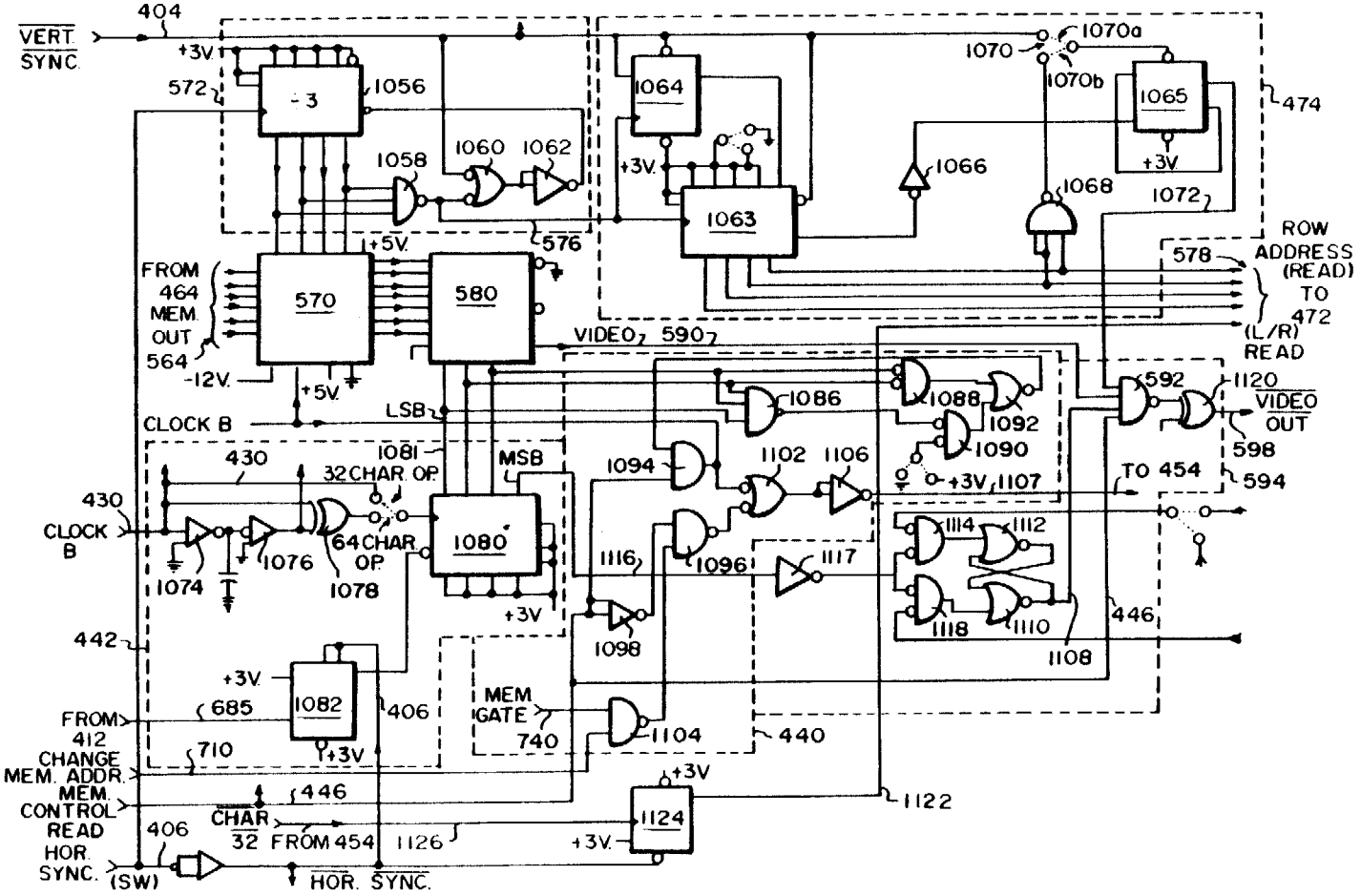
FIG. 13 is a logic diagram, partially in schematic, of another portion of the memory and output processing portion of the receiver illustrated in FIG. 7.

Referring now to FIG. 13, the balance of the memory and output processor portion of the receiver portion 28 of the row grabbing system 10 of the present invention shall be described in greater detail, this portion having previously been generally described with reference to FIGS. 3, 6 and 7. Line counter 572 preferably compirses a four bit conventional divide-by-13 counter 1056, such as the type manufactured by Texas Instruments under designation SN74163N, having parallel binary output which is preferably decoded by a NAND gate 1058 which provides a low level output pulse after the thirteenth count as one input to a two input negative NOR gate 1060 and, in parallel, via path 576 to the row counter 474. In the example given, a row, which is preferably the contents of a pseudo video scan line 12, is preferably described as comprising 13 conventional television scan lines. The other input to gate 1060 is the inverted vertical sync signal provided via path 404. The output of gate 1060 is preferably inverted by an inverter 1062 and applied to the clear input of counter 1056. This serves to reset the line counter 572 every 13 count or row and also at the vertical sync. The output of decoder gate 1058, as previously described is also the clock input of the row counter 474.

Row counter 474 preferably comprises a four bit conventional binary counter 1063, such as the type manufactured by Texas Instruments under the designation SN74161N, which is clocked by the row clock provided from gate 1058 on path 576. Counter 1063 is initially preset to a count of 15 or 13 depending on if it is set up for 16 or 12 rows, respectively. The clear input of counter 1063 is preferably connected to the output of a D-type flip-flop 1064 which is initially cleared during the vertical sync period. At the occurrence of the first output pulse from decode gate 1058 (which is provided in parallel to the clock input of flip-flop 1064, as well as to counter 1063) which occurs after the vertical sync, flip-flop 1064 is clocked. Prior to flip-flop 1064 being clocked, the output of flip-flop 1064 is low causing counter 1063 to be preset. After the clocking of flip-flop 1064, counter 1063 is allowed to count and continues to count continuously until reset at the beginning of the next field, which is one full vertical scan. Row counter 474 also preferably includes another conventional D flip-flop 1065 which is preferably utilized to generate a vertical unblanking signal. During 16 row operation, flip-flop 1065 is initially cleared by the vertical sync signal present on path 404. This 16 row operation is indicated by position 1070a of switch 1070, 12 row operation being indicated by position 1070b of switch 1070. At the start of the first row, the carry output of counter 1063, as inverted by conventional inverter 1066, clocks flip-flop 1065 whose output then goes high. The output of flip-flop 1065 remains high until counter 1063 completes 16 counts more, for 16 row operation, at which time the output of flip-flop 1065 is then clocked low.

During 12 row operation, which is switch position 1070b, counter 1063 is preset to 13 at the vertical sync as opposed to 15 which is utilized for 16 row operation. At the third subsequent count after preset, the output of counter 1063 clocks flip-flop 1065 so that the output of flip-flop 1065 goes high. When counter 1063 counts to 12, in this instance, a conventional NAND gate 1068, which is connected in parallel to the output of counter 1063, decodes this value of 12 and generates a low output which, through switch position 1070b, clears flip-flop 1065. As a result, flip-flop 1065, during either 12 row or 16 row operation provides a high output on path 1072 to NAND gate 592 during the time that valid rows are generated.

As was previously mentioned with reference to FIG. 7, the parallel output of line counter 1056 is also provided in parallel to the inputs of a conventional character generator 570, such as the type manufactured by Signetics under the designation 2525N in a standard format, character generator 570 preferably being a conventional read only memory character generator whose data input is the parallel data output 564 of memory 464. The output of character generator 570, as was previously mentioned with reference to FIG. 5, is provided to multiplexer 580, which is preferably a conventional multiplexer, such as the type manufactured by Texas Instruments under the designation SN74151An, the output of multiplexer 580 being the video signal provided via path 590 to NAND gate 592 and, therefrom, through an exclusive or 1120 (functioning as an inverter) of the blanking logic 594, to path 598 as the video output signal.

Referring now to the column counter 442, this counter 442 preferably includes a pair of inverters 1074 and 1076 which provide a predetermined delay, such as 100 nanoseconds in the clock B signal provided via path 430, this delay time preferably representing a fraction of the clock period. The delayed clock B signal is preferably supplied to one input of a two input exclusive or gate 1078 whose other input is directly connected to the clock B input provided via path 430. Exclusive or gate 1078 preferably provides an output only during the period of time that the delayed clock B signal overlaps the undelayed clock B signal. This occurs twice per clock period and, as a result, two output pulses are available from gate 1078 for each input pulse. Accordingly, inverters 1074 and 1076 and gate 1078 form a conventional frequency doubler. The double frequency output of gate 1078, which is twice the clock B frequency, is utilized as the clock input for a conventional divide-by-8 counter 1080, such as the type manufactured by Texas Instruments under the designation SN74161N, which is a four bit binary counter connected as a divide-by-8 counter, although if desired a conventional divide-by-8 counter could be utilized. This double frequency clock signal is preferably utilized as the clock for counter 1080 only during 64 character operation. During 32 character operation, that is 32 characters per video row versus 64 characters per video row, counter 1080 is clocked directly by the clock B signal provided via path 430. Counter 1080, which preferably provides the least significant bit via path 1081 to multiplexer 580 and the most significant bit via path 1116 to the blanking logic 594, is cleared by the output of a conventional flip-flop 1082 which flip-flop 1082 is clocked by the character 2 timing signal output provided via path 685 from decoder 412. Flip-flop 1082 is initially cleared by the horizontal sync signal provided in parallel via path 406 and then is set at the start of character 2 by the signal provided via path 685 from decoder 412. This serves to keep counter 1080 in the cleared state until the time corresponding to the beginning of the second character of the pseudo video scan line 12. This provides an initial delay for the displayed characters to provide a left-hand margin for the video display. The three least significant bits from counter 1080 preferably provide the addressing inputs for multiplexer 580; thus, they supply the divide-by-8 count sequence needed by multiplexer 580. The most significant bit provided from counter 1080 via path 1116 to blanking logic 594 preferably alternates states, that is from 1-to-0 to-1-to-0 etc., at the character rate.

Multiplexer 440 is preferably a conventional multiplexer which preferably includes an inverter 1098 which, together with conventional NAND gates 1094 and 1096, selects the appropriate clock for the character counter 454 during the read and write modes of the memory 464, the character clock during the memory write mode being provided from decoder 412 and during the memory read mode being provided from column counter 442. During the memory read mode, line 446 is high and one input to NAND gate 1094 is high while one input to NAND gate 1096 is low. In this condition, the clock available at the other input to NAND gate 1094 is selected and appears at the output of gate 1094 and at the output of negative NOR gate 1102 which has one input connected to the output of gate 1094 and the other input connected to the output of gate 1096, the input that is connected to the output of gate 1094 being connected in parallel to the clock B input. One input to gate 1096 is the output of another two input NAND gate 1104. During the memory write mode, line 446 is low, one input of NAND gate 1096 is high and the clock available at the output of NAND gate 1104, which has the memory gate signal provided via path 740 as one input thereto and the change memory address signal provided via path 710 as the other input thereto, is utilized as the character counter clock. The write mode character counter clock from NAND gate 1104 is obtained from the change memory address line 710 from decoder 412 as gated on by the memory gate line 740 from decoder 412. The memory gate on path 740 serves to allow the number of write clocks that corresponds exactly to the 32 data characters written into memory 464. During the memory read mode, the character address counter clock is provided by NOR gate 1092. This clock is generated by decoding the output of counter 1080 provided via path 1116, such that one clock pulse is generated for each eight counts of the counter 1080. A different decode is normally preferably required for 32 and 64 character operation.

The decoding of the output of counter 1080 is accomplished by NAND gate 1086, whose inputs are the three least significant bits of the counter 1080 output, and negative NAND gates 1088 and 1090. The different decodes are required because a fixed propagation delay represents a different proportion of character width in 64 character operation as compared to 32 character operation. Whichever character address counter clock output is selected preferably appears inverted at the output of negative NOR gate 1102 and non-inverted through inverter 1106 on path 1107 to character counter 454.

BLANKING LOGIC

Now the blanking logic 594 will be described in greater detail with reference to FIG. 13. Blanking is accomplished by NAND gate 592, as previously mentioned. The video output from multiplexer 580 provided via path 590 is supplied to one of four inputs of NAND gate 592. The vertical unblanking signal is provided to another input of NAND gate 592 from flip-flop 1065 via path 1072. The memory control signal provided on path 446 is provided in parallel to another input of NAND gate 592 to provide unblanking during the memory read mode. Lastly, the horizontal unblanking signal is provided to NAND gate 592 via path 1108, the horizontal unblanking signal on path 1108 being generated by a conventional RS flip-flop 1110–1112 arrangement. During 64 character operation flip-flop 1110–1112 is preferably set by the output of a negative NAND gate 1114 which goes high when the character 3 timing pulse of decoder 412 is present and counter 1080 has counted to 8, as indicated by the signal present on the most significant bit line 1116, as inverted by inverter 1117. During 32 character operation, the character 4 timing pulse from decoder 412 is preferably utilized in lieu of the character 3 timing pulse. The setting of flip-flop 1110–1112 provides the horizontal unblanking start signal on path 1108 which is high when the horizontal unblanking signal is present thereon. Negative NAND 1118 terminates the horizontal unblanking signal by resetting flip-flop 1110–1112 when the character 40 timing pulse is present from decoder 412 and counter 1080 has counted to 8 as indicated by the signal on path 1116 as inverted by inverter 1117. As was previously mentioned, the output of NAND gate 592 is provided to exclusive or gate 1120 which is conventionally utilized as an inverter, NAND gate 592 providing an output when video is present and all unblanking lines 1108,1072 and 446 are asserted.

As shown and preferred in FIG. 13, another conventional flip-flop 1124 is utilized to provide the left/right read address bit on path 1122 for 64 character operation. Flip-flop 1124 is initially cleared by the horizontal sync signal provided via path 406 so that output path 1122 is initially low. When the character counter 454 completes a count of 32 as indicated by the signal provided via path 1126 to the clock input of flip-flop 1124, flip-flop 1124 is set so that output path 1122 goes high. Output path 1122 is utilized by main memory 464 to select a different set of 32 characters for the right hand side of the 64 character display during 64 character operation. During 32 character operation, flip-flop 1124 does not come into play.

The balance of the circuitry associated with the receiver portion 28 of the row grabbing system 10 of the present invention has been adequately described with reference to the block diagrams of FIGS. 3 through 7 as it is conventional and readily understandable by one of ordinary skill in the art without further explanation, and accordingly, will not be described in further detail.

By utilizing the row grabbing system 10 of the present invention, conventional television transmission techniques and distribution equipment can be utilized for transmission and reception of data which has been packed into pseudo video scan lines which look like a conventional TV scan line to television equipment but contain a complete packet of information suitable for display of an entire row of video information, noise immunity between pseudo video scan lines is provided due to all input logic being reset every sync pulse so that every pseudo video scan line which is processed starts fresh and any loss of synchronization or the occurrence of a noise pulse will be prevented from disrupting more information than one pseudo video scan line or row, a grabbed frame may be updated on a row-by-row basis rather than an entire page by page basis, significant data transmission time and increased data bit rate may be achieved and the update time can be much greater than in a conventional frame grabbing system, such as the type utilizing conventional page-by-page video transmission.

It is to be understood that all logic described herein is conventional unless otherwise specified.

It is to be understood that the above described embodiment of the invention is merely illustrative of the principles thereof and that numerous modifications and embodiments of the invention may be derived within the spirit and scope thereof, such as by utilizing a different error check scheme, such as one utilizing the sum of the numerical value of each character present as the error check sum, providing for the transmission of a color display, such as a color background for one or more rows in the video display, as well as many other modifications that will occur to one of ordinary skill in the art.

What is claimed is:

1. A real time frame grabbing system for substantially instantaneously providing a continuous video display of a selectable predetermined video frame of information on a video display means from continuously transmittable video information comprising means for transmitting said video information as a plurality of pseudo video scan lines, each of said pseudo video scan lines having a television video scan line format and capable of comprising a complete self-contained packet of digital information sufficient to provide an entire displayable row of video data characters, said pseudo video scan line having an associated transmission time equivalent to said television video scan line, said packet of digital information comprising at least address information for said displayable row and data information for said displayable characters in said displayable row, each of said pseudo video scan lines further comprising a horizontal sync signal at the beginning thereof, said horizontal sync signal providing a record separator between adjacent pseudo video scan lines, said transmitting means further comprising means for providing a vertical sync signal after a predetermined plurality of pseudo video scan lines have been transmitted, said pseudo video scan line being a composite video signal, said system further comprising television signal distribution means for distributing said transmitted composite pseudo video scan line signals to said video display means for providing said continuous video display [.], *and receiver means operatively connected between said television signal distribution means and said video display means for processing said distributed composite pseudo video scan line signals and capable of providing a displayable video row signal to said video display means from a pseudo video scan line signal pertaining to said selected frame for providing said continuous video display, said receiver means comprising means for updating said continuously video displayable selectable frame on a displayable video row-by-row basis as said data portion of any of said displayable received distributed pseudo video scan line signals pertaining to said selected frame is updated.*

2. A real time frame grabbing system in accordance with [claim] *claims 1 or 28* wherein said composite pseudo video scan line signal provided by said transmitting means comprises a three level signal having first, second and third signal levels with said digital data information varying between said second and third signal levels and said horizontal sync signal information being provided between said first and second signal levels.

3. A real time frame grabbing system in accordance with [claim] *claims 1 or 28* [further comprising receiver means operatively connected between said television signal distribution means and said video display means for processing said distributed composite pseudo video scan line signals and] *wherein said processing means comprises means* capable of providing a displayable video row signal to said video display means from each of said pseudo video scan line signals pertaining to said selected frame for providing said continuous video display, a predetermined plurality of displayable video rows comprising a displayable video frame of information.

4. A real time frame grabbing system in accordance with claim 3 wherein said composite video scan line signal further comprises clock signal reference frequency information, said receiver signal processing means comprising means for providing a master clock signal output in accordance with said reference frequency information and a predetermined data bit rate, and decoder means operatively connected to said master clock signal output for providing timing control signals for said receiver signal processing means indicative of predetermined character positions within said pseudo video scan line signal and predetermined bit positions within a character for processing said distributed pseudo video scan line to provide said displayable video row signal therefrom.

5. A real time frame grabbing system in accordance with claim 3 wherein said receiver signal processing means comprises means responsive to the occurrence of said horizontal sync signal for each distributed pseudo video scan line for resetting said processing means in response to each detection of said horizontal sync signal, whereby noise immunity for said system is enhanced.

6. A real time frame grabbing system in accordance with claim [3] *1* wherein said [receiver] *updating* means comprises means for updating said continuously video displayable selectable frame on a displayable video row-by-row basis dependent on the real time data information content of said received pseudo video scan [lines] *line.*

7. A real time frame grabbing system in accordance with claim [6] *1* wherein said updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

8. A real time frame grabbing system in accordance with claim [3] *1 or 28* wherein each of said packets of digital information further comprises an error check information content based on at least the address and data information content of an associated pseudo video scan line, said receiver signal processing means comprising error check means for obtaining an error check indication from said distributed associated pseudo video scan line and comparing said error check indication with said error check information content of said associated pseudo video scan line in accordance with a predetermined error check condition for providing a predetermined output condition signal when said error check condition is satisfied, said receiver signal processing means further comprising condition responsive means operatively connected to said error check means to receive said predetermined output condition signal therefrom when provided, said condition responsive means inhibiting the provision of said displayable video row from said associated pseudo video scan line signal when said predetermined output condition signal is not provided thereto.

[9. A real time frame grabbing system in accordance with claim 8 wherein said receiver means comprises means for testing said address information portion of said distributed pseudo video scan line signal for satisfaction of at least one predetermined signal reception condition, said address information testing means providing a predetermined output condition when said reception condition is satisfied, memory means for retrievably storing said pseudo video scan line data portion for providing said displayable video row therefrom and delay means for delaying the storing of said distributed pseudo video scan line signal data portion for a sufficient interval to enable testing for said error check condition and testing of said address information prior to storing of said pseudo video scan line data portion, said condition responsive means being further operatively connected to said address information testing means for inhibiting the storage of said data portion in said memory means when said predetermined output condition signals from said testing means are not provided thereto, whereby the provision of said displayable video row from said associated pseudo video scan line signal is inhibited.]

10. A real time frame grabbing system in accordance with claim [9] *1* wherein said receiver means further comprises keyboard means for selecting said predetermined video frame to be continuously displayed, said address information comprising information corresponding to the frame associated with said distributed pseudo video scan line, said address information testing means comprising means for testing said frame information, said reception condition being correspondence between said frame information and said selected frame.

[11. A real time frame grabbing system in accordance with claim 9 wherein a predetermined pseudo video scan line signal contains permission information representative of predetermined frames which a video display means is authorized to receive for video display thereof, said receiver means comprising means for storing said authorized frames, said address information comprising information corresponding to the frame associated with said distributed pseudo video scan line, said address information testing means comprising means for testing said frame information, said reception condition being correspondence between said frame information and stored authorized frame.]

12. A real time frame grabbing system in accordance with claim [1] *28* wherein said system further comprises programmable means for receiving said continuously transmittable video information, retrievably storing said information, reformatting said stored information into a desired pseudo video scan line format and continuously providing this reformatted information to said transmitting means a word at a time, said word comprising a pair of displayable characters.

[13. A real time frame grabbing system in accordance with claim 12 wherein said programmable means includes means for interleaving said reformatted pseudo video scan line information to provide pseudo video scan line information corresponding to a common assigned row for a plurality of frames to said transmitting means before providing pseudo video scan line information corresponding to a subsequent different common assigned row for said plurality of frames to said transmitting means.]

14. A real time frame grabbing system in accordance with claim 12 wherein said transmitting means comprises a first-in-first-out serial word memory means having a storage capacity of a predetermined plurality of words operatively connected to said programmable means for receiving said reformatted information word transmission therefrom, and means for controlling the strobing of data out of said first-in-first-out memory means operatively connected to said first-in-first-out memory means, said programmable means controlling the strobing of data into said first-in-first-out memory means.

15. A real time frame grabbing system in accordance with claim 14 wherein said transmitter means comprises a master clock signal generation means for controlling the bit rate of transmission of said pseudo video scan line signals, bit counting means operatively connected to said master clock signal generation means for counting said clock signal and providing an output pulse each time said bit count corresponds to a predetermined common quantity of bits in a displayable character, said output pulse representing the start of said character, means for generating a composite sync signal and vertical drive signal, said master clock signal generation means synchronizing said bit rate with said composite sync signal, means operatively connected to said sync signal generation means for providing a frame enable signal at a predetermined vertical scan position after said vertical drive signal, said means for controlling the strobing of data out of said first-in-first-out memory means capable of receiving a ready to transmit data signal from said first-in-first-out memory means and comprising condition responsive means operatively connected to said sync signal generating means for receiving said composite sync signal therefrom, said bit counting means for receiving said output pulse therefrom, said frame enable signal providing means for receiving said frame enable signal therefrom and said first-in-first-out memory means for receiving said ready to transmit data signal therefrom for controlling said strobing of data out from said first-in-first-out memory means in response to said received signals for providing said data information portion for one of said pseudo video scan line signals.

16. A real time frame grabbing system in accordance with claim 15 wherein said transmitter means further comprises sync combining means operatively connected to said first-in-first-out memory means for receiving said one pseudo video scan line signal data information portion and to said sync signal generating means for receiving said composite sync signal therefrom for providing said composite pseudo video scan line signal to said distribution means.

17. A real time frame grabbing system in accordance with claim 16 wherein said transmitter means further comprises a shift register means operatively connected between said first-in-first-out memory means output and said sync combining means input, said shift register means further being operatively connected to said bit counting means output and said master clock signal generating means output for loading said one pseudo video scan line signal data portion from said first-in-first-out memory means into said shift register means in response to said bit counting means output pulse, said shift register means shifting out said loaded one pseudo video scan line signal data portion for providing said data portion to said sync combining means at a shift rate established by said master clock signal.

18. A real time frame grabbing system in accordance with claim 17 wherein said transmitter means further comprises flip-flop means and character counting means having its input connected to said bit counting means output for clocking said character counting means in response to said bit counting means output pulse for providing an output pulse when a quantity of bit counting means output pulses corresponding to a predetermined total number of characters comprising one pseudo video scan line signal has been counted for establishing a time period corresponding to said total number of characters, said character counting means output being connected to said flip-flop means for receiving said character counting means output pulse and providing a sync burst gate signal output in response thereto, said flip-flop means being further operatively connected to said sync signal generating means for receiving said composite sync signal, said flip-flop means being set by said character counting means output pulse and reset by said composite sync signal, said transmitter means further comprising a selectable multiplexer means having a first input operatively connected to said shift register means output and a second input operatively connected to said master clock signal generating means output for providing a clock synchronizing burst signal thereto and further being connected to said flip-flop means output for switching between said first and second inputs in response thereto, said multiplexer means output being connected to said sync combining means input for selectively providing said first and second inputs thereto, said clock synchronizing burst signal being selected during the interval of said sync burst gate signal, said shift register means output being selected when said sync burst gate signal output is not provided and said shift register means output is provided, said composite pseudo video scan line signal further comprising said clock synchronizing burst signal for an interval corresponding to said sync burst gate interval.

19. A real time frame grabbing system for substantially instantaneously providing a continuous video display of a selectable predetermined video frame of information on a video display means from a plurality of pseudo video scan lines, each of said pseudo video scan lines having a television video scan line format and capable of comprising a complete self-contained packet of digital information sufficient to provide an entire displayable row of video data characters, said pseudo video scan line having an associated transmission time equivalent to said television scan line, said packet of digital information comprising at least address information for said displayable row and data information for said displayable characters in said displayable row, each of said pseudo video scan lines further comprising a horizontal sync signal at the beginning thereof, said horizontal sync signal providing a record separator between adjacent pseudo video scan lines, said pseudo video scan line being a composite video signal, said system comprising means for selecting said predetermined video frame to be continuously displayed and means operatively connected to said video display means and said frame selection means for processing said composite pseudo video scan line signals and capable of providing a displayable video row signal to said video display means from each of said pseudo video scan line signals pertaining to said selected frame for providing said continuous video display, a predetermined plurality of displayable video rows comprising a displayable video frame of information [.], *said processing means comprising means for updating said continuously video displayable selectable frame on a displayable video row-by-row basis as said data portion of any of said displayable received distributed pseudo video scan line signals pertaining to said selected frame is updated.*

20. A real time frame grabbing system in accordance with claim 19 *or 29* wherein said processing means comprises means responsive to the occurrence of said horizontal sync signal for each pseudo video scan line for resetting said processing means in response to each detection of said horizontal sync signal, whereby noise immunity for said system is enhanced.

21. A real time frame grabbing system in accordance with claim 19 *or 29* wherein said composite pseudo video scan line signal further comprises clock signal reference frequency information, said processing means comprising means for providing master clock signal output in accordance with said reference frequency information and a predetermined data bit rate, and decoder means operatively connected to said master clock signal output for providing timing control signals for said processing means indicative of predetermined character positions within said pseudo video scan line signal and predetermined bit positions within a character for processing said distributed pseudo video scan line to provide said displayable video row signal therefrom.

22. A real time frame grabbing system in accordance with claim 19 wherein said [processing] *updating* means comprises means for updating said continuously video displayable selectable frame on a displayable video row-by-row basis dependent on the real time data information content of said received pseudo video scan lines.

23. A real time frame grabbing system in accordance with claim [22] *19* wherein said updating means comprises memory means for retrievably storing said pseudo video scan line data portion for providing said displayable video row therefrom, said memory means retrievably stored data portion being continuously updateable as said data portion of said pseudo video scan line signal associated therewith is updated.

24. A real time frame grabbing system in accordance with claim 19 *or 20* wherein each of said packets of digital information further comprises an error check information content based on at least the address and data information content of an associated pseudo video scan line, said processing means comprising error check means for obtaining an error check indication from said distributed associated pseudo video scan line and comparing said error check indication with said error check information content of said associated pseudo video scan line in accordance with a predetermined error check condition for providing a predetermined output condition signal when said error check condition is satisfied, said processing means further comprising condition responsive means operatively connected to said error check means to receive said predetermined output condition signal therefrom when provided, said condition responsive means inhibiting the provision of said displayable video row from said associated pseudo video scan line signal when said predetermined output condition signal is not provided thereto.

[25. A real time frame grabbing system in accordance with claim 24 wherein said processing means comprises means for testing said address information portion of said distributed pseudo video scan line signal for satisfaction of at least one predetermined signal reception condition, said address information testing means providing a predetermined output condition when said reception condition is satisfied, memory means for retrievably storing said pseudo video scan line data portion for providing said displayable video row therefrom and delay means for delaying the storing of said distributed pseudo video scan line signal data portion for a sufficient interval to enable testing for said error check condition and testing of said address information prior to storing of said pseudo video scan line data portion, said condition responsive means being further operatively connected to said address information testing means for inhibiting the storage of said data portion in said memory means when said predetermined output condition signal from said testing means are not provided thereto, whereby the provision of said displayable video row from said associated pseudo video scan line signal is inhibited.]

26. A real time frame grabbing system in accordance with claim [24] *29* wherein said selection means comprises keyboard means, said address information comprising information corresponding to the frame associated with said pseudo video scan line, said address information testing means comprising means for testing said frame information, said reception condition being correspondence between said frame information and said selected frame.

[27. A real time frame grabbing system in accordance with claim 25 wherein a predetermined pseudo video scan line signal contains permission information representative of predetermined frames which a video display means is authorized to receive for video display thereof, said processing means comprising means for storing said authorized frames, said address information comprising information corresponding to the frame associated with said pseudo video scan line, said address information testing means comprising means for testing said frame information, said reception condition being correspondence between said frame information and stored authorized frame.]

*28. A real time frame grabbing system for substantially instantaneously providing a continuous video display of a selectable predetermined video frame of information on a video display means from continuously transmittable video information comprising means for transmitting said video information as a plurality of pseudo video scan lines, each of said pseudo video scan lines having a television video scan line format and capable of comprising a complete self-contained packet of digital information sufficient to provide an entire displayable row of video data characters, said pseudo video scan line having an associated transmission time equivalent to said television video scan line, said packet of digital information comprising at least address information for said displayable row and data information for said displayable characters in said displayable row, each of said pseudo video scan lines further comprising a horizontal sync signal at the beginning thereof, said horizontal sync signal providing a record separator between adjacent pseudo video scan lines, said transmitting means further comprising means for providing a vertical sync signal after a predetermined plurality of psuedo video scan lines have been transmitted, said pseudo video scan line being a composite video signal, said system further comprising television signal distribution means for distributing said transmitted composite pseudo video scan line signals to said video display means for providing said continuous video display and programmable means for receiving said continuously transmitted video information, retrievably storing said information, reformatting said stored information into a desired pseudo video scan line format and continuously providing this reformatted information to said transmitting means, said programmable means including means for interleaving said reformatted pseudo video scan line information corresponding to a common assigned row for a plurality of frames to said transmitting means before providing pseudo video scan line information corresponding to a subsequent different common assigned row for said plurality of frames to said transmitting means.*

*29. A real time frame grabbing system for substantially instantaneously providing a continuous video display of a selectable predetermined video frame of information on a video display means from a plurality of pseudo video scan lines, each of said pseudo video scan lines having a television video scan line format and capable of comprising a complete self-contained packet of digital information sufficient to provide an entire displayable row of video data characters, said pseudo video scan line having an associated transmission time equivalent to said television scan line, said packet of digital information comprising at least address information for said displayable row and data information for said displayable characters in said displayable row, each of said pseudo video scan lines further comprising a horizontal sync signal at the beginning thereof, said horizontal sync signal providing a record separator between adjacent pseudo video scan lines, said pseudo video scan line being a composite video signal, said system comprising means for selecting said predetermined video frame to be continuously displayed and means operatively connected to said video display means and said frame selection means for processing said composite pseudo video scan line signals and capable of providing a displayable video row signal to said video display means from each of said pseudo video scan line signals pertaining to said selected frame for providing said continuous video display, a predetermined plurality of displayable video rows comprising a displayable video frame of information, said processing means compris-*

*ing means for updating said continuously video displayable selectable frame on a displayable video row-by-row basis as said data portion of any of said displayable received distributed pseudo video scan line signals pertaining to said selected frame is updated. a predetermined pseudo video scan line signal containing permission information representative of predetermined frames which a video display means is authorized to receive for video display thereof, said processing means comprising means for storing said authorized frames and for testing said address information portion of said distributed pseudo video scan line signal for satisfaction of at least one predetermined signal reception condition. said address information testing means providing a predetermined output condition signal when said reception condition is satisfied, said processing means further comprising condition responsive means operatively connected to said address information testing means for inhibiting the storage of said distributed pseudo video scan line signal data portion in said authorized frame storing means when said predetermined output condition signal is not provided thereto from said testing means, said address information comprising information corresponding to the frame associated with said distributed pseudo video scan line, said address information testing means comprising means for testing said frame information, said reception condition being correspondence between said frame information and stored authorized frame, whereby the provision of said displayable video row from said associated pseudo video scan line is inhibited in the absence of authorization for display thereof.*

*30. A real time frame grabbing system in accordance with claim 8 wherein said receiver means further comprises memory means for retrievably storing said pseudo video scan line data portion for providing said displayable video row therefrom and delay means for delaying the storing of said distributed pseudo video scan line signal data portion for a sufficient interval to enable testing for said error check condition and testing of said address information prior to storing of said pseudo video scan line data portion.*

*31. A real time frame grabbing system in accordance with claim 24 wherein said processing means further comprises memory means for retrievably storing said pseudo video scan line data portion for providing said displayable video row therefrom and delay means for delaying the storing of said distributed pseudo video scan line signal data portion for a sufficient interval to enable testing for said error check condition and testing of said address information prior to storing of said pseudo video scan line data portion.*

* * * * *

UNITED STATES PATENT AND TRADEMARK OFFICE

CERTIFICATE OF CORRECTION

PATENT NO. : Re 32,326

DATED : January 6, 1987

INVENTOR(S) : Robert H. Nagel et al.

It is certified that error appears in the above-identified patent and that said Letters Patent is hereby corrected as shown below:

| | |
|---|---|
| In the Caption, Item [73]: | Change "IRD" to --IDR-- and "Farmingdale" to --New York--; |
| In the Abstract, line 18: | Change "psuedo" to --pseudo--; |
| In column 2, line 42: | Change "can" to --scan--; |
| In column 2, line 47: | Change "vieo" to --video--; |
| In column 4, line 63: | Delete first "is"; |
| In column 6, line 43: | After "2004" insert semicolon; |
| In column 9, line 1: | Change "arrangemet" to --arrangement--. |

Signed and Sealed this

Sixteenth Day of February, 1988

*Attest:*

*Attesting Officer*

DONALD J. QUIGG

*Commissioner of Patents and Trademarks*